(12) United States Patent
Hara et al.

(10) Patent No.: US 10,780,627 B2
(45) Date of Patent: Sep. 22, 2020

(54) METHOD FOR FORMING THREE-DIMENSIONAL OBJECT

(71) Applicant: MIMAKI ENGINEERING CO., LTD., Nagano (JP)

(72) Inventors: Hirofumi Hara, Nagano (JP); Masaya Nagahari, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 374 days.

(21) Appl. No.: 15/880,535

(22) Filed: Jan. 26, 2018

(65) Prior Publication Data

US 2018/0147775 A1    May 31, 2018

Related U.S. Application Data

(62) Division of application No. 14/956,400, filed on Dec. 2, 2015, now abandoned.

(30) Foreign Application Priority Data

Dec. 2, 2014    (JP) .................................. 2014-244110
Nov. 30, 2015    (JP) .................................. 2015-233846

(51) Int. Cl.
*B29C 64/112* (2017.01)
*B33Y 10/00* (2015.01)
(Continued)

(52) U.S. Cl.
CPC .... *B29C 64/112* (2017.08); *B29K 2105/0058* (2013.01); *B29K 2505/00* (2013.01);
(Continued)

(58) Field of Classification Search
CPC .............................. B33Y 30/00; B33Y 10/00
See application file for complete search history.

(56) References Cited

U.S. PATENT DOCUMENTS

2010/0191360 A1* 7/2010 Napadensky ......... B29C 67/202
700/98

FOREIGN PATENT DOCUMENTS

JP    2008302701    12/2008
JP    2011068055    4/2011
(Continued)

OTHER PUBLICATIONS

Office Action of Japan Counterpart Application, with English translation thereof, dated Feb. 26, 2019, pp. 1-7.

*Primary Examiner* — Galen H Hauth
(74) *Attorney, Agent, or Firm* — JCIPRNET

(57) ABSTRACT

There is provided a method for forming a three-dimensional object having a desired decoration. The method using an apparatus for forming a three-dimensional object configured to form a three-dimensional object includes: a head for reflective ink configured to form a light reflection layer, a head for decorative ink, a head for transparent ink, a main scanning driving unit and a sub-scanning driving unit. At least the head for decorative ink and the head for transparent ink are arranged to be positionally offset in a sub-scanning direction, the head for reflective ink, the head for decorative ink and the head for transparent ink are configured to form a transparent layer between the light reflection layer and a decorative layer, thereby forming the decorative layer, the transparent layer and the light reflection layer in corresponding order from a surface layer-side of the three-dimensional object towards an inner side of the three-dimensional object.

9 Claims, 10 Drawing Sheets

(51) Int. Cl.
 *B33Y 30/00* (2015.01)
 *B29K 105/00* (2006.01)
 *B29K 505/00* (2006.01)

(52) U.S. Cl.
 CPC .. *B29K 2995/002* (2013.01); *B29K 2995/003* (2013.01); *B29K 2995/0026* (2013.01); *B33Y 10/00* (2014.12); *B33Y 30/00* (2014.12)

(56) References Cited

FOREIGN PATENT DOCUMENTS

| | | |
|---|---|---|
| JP | 2011178050 | 9/2011 |
| JP | 2014503384 | 2/2014 |

* cited by examiner

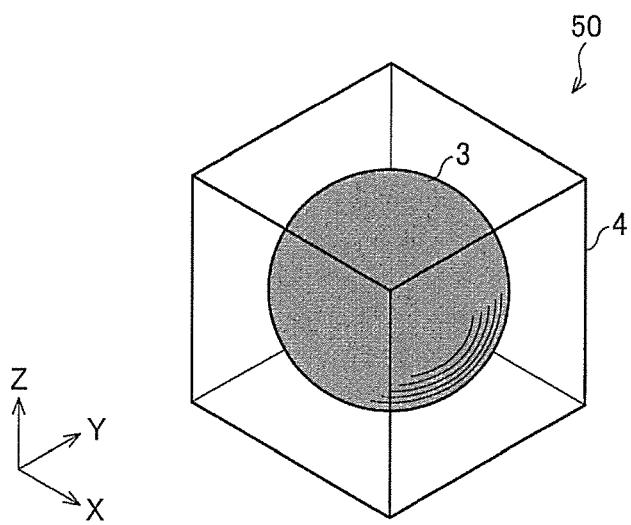
FIG. 8A
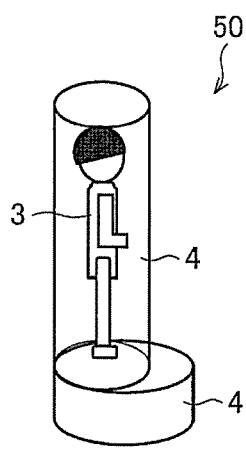 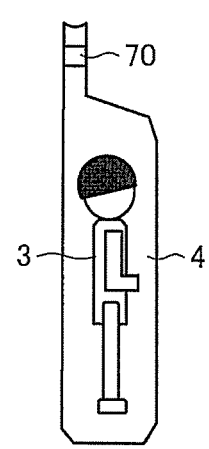 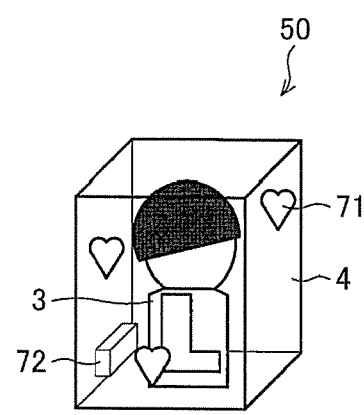
FIG. 8B  FIG. 8C  FIG. 8D

METHOD FOR FORMING THREE-DIMENSIONAL OBJECT

CROSS-REFERENCE TO RELATED APPLICATIONS

This application is a divisional application of and claims the priority benefit of U.S. patent application Ser. No. 14/956,400, filed on Dec. 2, 2015, now pending, which claims priority from Japanese Patent Application No. 2014-244110, filed on Dec. 2, 2014, and Japanese Patent Application No. 2015-233846, filed on Nov. 30, 2015. The entirety of each of the above-mentioned patent applications is hereby incorporated by reference herein and made a part of this specification.

TECHNICAL FIELD

The disclosure relates to a method for forming a three-dimensional object.

DESCRIPTION OF THE BACKGROUND ART

As a method for forming a three-dimensional (3D) object, a fused deposition molding (FDM) method, an inkjet method, an inkjet binder method, a stereo lithography (SL) method, a selective laser sintering (SLS) method and the like have been known, in addition to a sheet lamination method disclosed in Patent Literature 1.

Among them, a method of injecting an ultraviolet curable resin to laminate a pattern by a 3D printer has been widely used, as the inkjet method. According to this method, designs/mechanisms of outward and inward appearances of a final product are prepared as data by a three-dimensional CAD (Computer Aided Design), the data is sliced to prepare multi-layered pattern data by a computer, like thin plates superimposed on each other, and the ultraviolet curable resin is injected and laminated from a head on the basis of the pattern data, so that a three-dimensional object is manufactured.

It has been also known that a three-dimensional object formed using the above method is subject to decoration (patterning, coloring and the like).

Patent Literature 1: JP-A-2003-71530 (published on Mar. 11, 2003).

Regarding the three-dimensional modeling by the well-known inkjet method, the inventors found that when an ink for modeling and an ink for decoration (for example, coloring inks of yellow, magenta, cyan, black and the like) are ejected by the inkjet method, the inks are mixed at an interface between the ink for modeling and the ink for decoration, so that a desired decoration (a color recording of a character, an image and the like by a subtractive color process) cannot be implemented.

The ink mixing is particularly conspicuous at a decorative part that is to be formed on a modeling surface enlarged in a direction perpendicular to a plane direction of each layer to be laminated. The reason is that since inkjet heads and a three-dimensional object relatively move along the plane direction of the laminated layer, the positional precision of the inks ejected from the inkjet heads with respect to the plane direction is lowered, so that the ink for modeling and the ink for decoration are mixed.

SUMMARY

Therefore, the disclosure provides an apparatus for forming a three-dimensional object and a method for forming a three-dimensional object capable of solving the above problem.

The inventors found out, after having extensively studied on a configuration of a three-dimensional object to be formed, a configuration capable of suppressing the problem of the ink mixing as described above. Also, the inventors found out, after the further extensive studies, that it is preferably to arrange inkjet heads for a plurality of utilities in a stagger arrangement form in an apparatus for forming a three-dimensional object and a method for forming a three-dimensional object, in order to form a three-dimensional object having the configuration. The disclosure has following configurations so as to solve the above problem.

Configuration 1

There is provided a method for forming a three-dimensional object, the method using: a head for reflective ink, which is an inkjet head configured to eject ink droplets of an ink having light reflectivity and is configured to form a light reflection layer, which is a layer of the ink having the light reflectivity; a head for decorative ink, which is an inkjet head configured to eject ink droplets of a decorative ink, which is an ink for decoration for the three-dimensional object, and is configured to form a decorative layer, which is a layer of the decorative ink, and a head for transparent ink, which is an inkjet head configured to eject ink droplets of a transparent ink, which is an ink of a transparent color, and is configured to form a transparent layer, which is a layer of the transparent ink. The method comprising enabling the head for reflective ink, the head for decorative ink and the head for transparent ink to perform: a main scanning operation of relatively moving to the three-dimensional object being formed in a preset main scanning direction and ejecting the ink droplets, and a sub-scanning operation of relatively moving to the three-dimensional object being formed in a sub-scanning direction perpendicular to the main scanning direction, wherein at least the head for decorative ink and the head for transparent ink are arranged to be positionally offset in the sub-scanning direction, and wherein the transparent layer is formed between the light reflection layer and the decorative layer by using the head for reflective ink, the head for decorative ink and the head for transparent ink, so that the decorative layer, the transparent layer and the light reflection layer are formed in corresponding order from a surface layer-side of the three-dimensional object towards an inner side of the three-dimensional object.

According to the above configuration, since the transparent layer is formed between the decorative layer and the light reflection layer in the three-dimensional object, the ink forming the light reflection layer and having the light reflectivity is not mixed with the decorative ink. More specifically, for example, when the decorative layer is a coloring layer formed of an ink including colorant, if the decorative layer is mixed with the ink forming the light reflection layer and having the light reflectivity, an ink color of the decorative layer is lost, so that a desired color tone cannot be implemented. In contrast, according to the above configuration, even if the ink forming the decorative layer is mixed with the transparent ink of the adjacent transparent layer, the ink color of the decorative layer is not lost. For this reason, in this case, the decoration of the three-dimensional object is not influenced. Therefore according to the above configuration, for example, it is possible to appropriately model a three-dimensional object having a desired decoration.

Also, in the above configuration, at least the head for decorative ink and the head for transparent ink are arranged to be positionally offset in the sub-scanning direction. More specifically, the head for decorative ink and the head for transparent ink may be disposed in a stagger arrangement, for example. By this configuration, it is possible to prevent a size of the apparatus for forming a three-dimensional object from being enlarged in the main scanning direction, for example, so that it is possible to implement a compact configuration. Also, for example, compared to a configuration where the head for decorative ink and the head for transparent ink are disposed side by side in an in-line arrangement, it is possible to reduce an amount of the ink to be ejected within a predetermined range in each of the main scanning operations. In this case, the in-line arrangement indicates an arrangement where the plurality of inkjet heads is disposed side by side in the main scanning direction with being positionally aligned in the sub-scanning direction.

Here, the apparatus for forming a three-dimensional object having the above configuration is configured to model a three-dimensional object by a lamination modeling method, for example. In this case, the lamination modeling method is a method of performing the forming by overlapping and laminating a plurality of ink layers, for example. Also, in this case, as the ink forming each layer, it is considered to use a curable ink that is to be cured depending on a predetermined condition.

In this case, when an amount of the ink to be ejected within a predetermined range in each of the main scanning operations increases, it is necessary to increase an output of a curing unit configured to cure the ink, for example. More specifically, for example, when an ultraviolet curable ink (UV ink) that is to be cured by ultraviolet irradiation is used as the curable ink, it is necessary to use a high-output UV irradiator and the like for an ultraviolet light source to be used as the curing unit.

However, when the output of the ultraviolet light source increases, the size of the apparatus also increases and the apparatus cost may largely increase, for example. Also, the problems due to the leakage light are likely to occur. More specifically, for example, when the influence of the leakage light increases, the curing of the ink starts in the vicinity of the nozzles of the inkjet head or in the nozzles, so that the ink may not be ejected or the deflection is likely to occur. Also, when a large amount of the ink is ejected and cured at one time, the cured ink may be polymerized, so that an influence of the cure shrinkage may increase. Also, when the high-output UV irradiator is used, the ink layer may be deformed due to the generated heat.

In contrast, according to the above configuration, it is possible to appropriately reduce the amount of the ink to be ejected within a predetermined range in each of the main scanning operations, so that it is possible to appropriately suppress the above-described problems. More specifically, for example, when performing the forming by using the ultraviolet curable ink, it is possible to appropriately cure the ink by using the ultraviolet light source having a lower output. Also, it is possible to more appropriately suppress the influence of the cure shrinkage, the deformation due to the heat, and the like.

Also, when the plurality of inkjet heads configured to eject the different types of the inks is arranged to be positionally offset in the sub-scanning direction, such as the stagger arrangement, it is possible to differently set the timings, at which the ink droplets are to be ejected to the respective positions of the three-dimensional object, for each of the inkjet heads. Thereby, it is also possible to more appropriately prevent the different types of the inks from being mixed.

Also, when forming the three-dimensional object by the lamination modeling method, it is necessary to flatten the ink layer by using a flattening unit such as a roller during the forming so as to suppress the influence of the non-uniformity of an ejection amount of the ink droplets. In this case, for example, if the plurality of inkjet heads configured to eject the different types of the inks is disposed in the in-line arrangement, the flattening is performed for the plurality of types of inks not cured yet at the same time. In this case, the inks are likely to be mixed due to the influence of the flattening operation.

In contrast, according to the above configuration, the timings, at which the ink droplets are to be ejected to the respective positions of the three-dimensional object, are differently set for each of the inkjet heads, for example. Thereby, it is possible to more appropriately prevent the inks from being mixed during the flattening operation by the roller, etc. For this reason, according to the above configuration, it is possible to more appropriately perform the flattening operation for the ink layer, for example. Thereby, it is also possible to model the three-dimensional object with higher precision, for example.

In the meantime, in the above configuration, the decorative ink is a colored ink for coloring, for example. Also, the configuration 'the head for decorative ink and the head for transparent ink are arranged to be positionally offset in the sub-scanning direction' indicates that the head for decorative ink and the head for transparent ink are arranged not to positionally overlap with each other in the sub-scanning direction, like the stagger arrangement. Also, the configuration 'the position does not overlap in the sub-scanning direction' indicates that positions of nozzle lines of each of the head for decorative ink and the head for transparent ink do not substantially overlap with each other in the sub-scanning direction, for example. In this case, the nozzle line is a line of which a plurality of lines is aligned side by side in the sub-scanning direction, for example. Also, the configuration 'the positions of the nozzle lines do not substantially overlap with each other in the sub-scanning direction' indicates that positions of nozzles except for at least, e.g., dummy nozzles set at an end portion of the nozzles configuring the nozzle line do not overlap with each other in the sub-scanning direction, for example.

Also, in the above configuration, as the ink having the light reflectivity, a white ink may be favorably used, for example. Also, as the white ink, for example, an ink including white pigment may be favorably used. According to this configuration, for example, it is possible to favorably reflect the incident light from the surface layer-side of the three-dimensional object via the decorative layer by the light reflection layer formed of the ink including the white pigment. Thereby, it is also possible to appropriately perform the coloring by a subtractive color process, for example.

Configuration 2

The head for reflective ink is arranged to be positionally offset in the sub-scanning direction with respect to each of the head for decorative ink and the head for transparent ink. In this case, the head for reflective ink is disposed in the stagger arrangement with respect to the head for decorative ink and the head for transparent ink, for example.

According to the above configuration, for example, it is possible to more appropriately implement a compact configuration for the apparatus for forming a three-dimensional object. Also, it is possible to more appropriately reduce an amount of the ink to be ejected within a predetermined range in each of the main scanning operations. Thereby, for example, it is possible to use a configuration having a lower output, as the curing unit (ultraviolet light source, and the like) configured to cure the ink. Also, for example, it is possible to more appropriately suppress the influence of the cure shrinkage, the deformation due to the heat, and the like. Further, for example, it is also possible to more appropriately prevent the ink having the light reflectivity the decorative ink, and the transparent ink from being mixed by differently setting the timings, at which the ink droplets are to be ejected to the respective positions of the three-dimensional object, for each of the inkjet heads.

Configuration 3

The head for transparent ink is configured to form a first transparent layer between the light reflection layer and the decorative layer and to further form a second transparent layer on the surface layer-side of the decorative layer.

According to the above configuration, the second transparent layer is formed on the surface layer-side of the three-dimensional object, so that it is possible to more appropriately protect the surface of the three-dimensional object, for example. More specifically, in this case, the decorative layer is protected by the second transparent layer, so that it is possible to appropriately prevent the discoloring due to the friction and the color degradation due to ultraviolet rays, for example. Also, the second transparent layer is formed on the surface layer-side, so that it is possible to form the compact and precise three-dimensional object, for example.

Configuration 4

The head for transparent ink is configured to supplement an ink filling density of the decorative layer by the transparent ink at a place where the ink filling density of the decorative layer does not satisfy a predetermined ink filling density only with the decorative ink. In this case, the transparent ink of the decorative layer can be used as a supplement ink that is the ink for supplementing the ink filling density, for example.

When the decorative layer is formed by only the decorative ink, the ink amount is large at a part in which a decoration density is high and is small at a part in which the decoration density is low. As a result, the ink filling density of the decorative layer is different depending on the places, so that an unevenness or a gap may be generated in the decorative layer. When the unevenness or the gap is generated, it causes the optical scattered reflection and the refraction. As a result, the decorative appearance may be damaged, and it may not be possible to model a three-dimensional object having a desired shape in a manufacturing process of the three-dimensional object.

In contrast, according to the above configuration, the transparent ink is used as the supplement ink, so that it is possible to appropriately supplement the ink filling density of the decorative layer. Thereby, it is also possible to appropriately suppress the unevenness or the gap from being generated in the decorative layer, for example. For this reason, according to this configuration, it is possible to more appropriately model a three-dimensional object having a desired shape for which a desired decoration has been performed.

Configuration 5

The method for forming a three-dimensional object is configured to model the three-dimensional object by laminating a plurality of layers, and the head for reflective ink, the head for decorative ink and the head for transparent ink are configured to form a part of the decorative layer, a part of the transparent layer, and a part of the light reflection layer in corresponding order from an end portion towards a center-side of each layer of two or more layers of the plurality of layers. According to this configuration, for example, it is possible to more appropriately model the three-dimensional object having the decorative layer, the transparent layer and the light reflection layer.

Configuration 6

The head for transparent ink is configured to form a first transparent layer between the light reflection layer and the decorative layer and to further form a second transparent layer on the surface layer-side of the decorative layer, and each of the two or more layers has the part of the decorative layer between a part of the first transparent layer and a part of the second transparent layer. According to this configuration, for example, it is possible to more appropriately model the three-dimensional object having the transparent layer on the surface layer-side of the three-dimensional object, too.

Configuration 7

The three-dimensional object has an area where the layers, each of which has the part of the decorative layer between the part of the first transparent layer and the part of the second transparent layer, are laminated each other, and in the area, a part with which the part of the decorative layer included in any layer and the part of the decorative layer included in the layer laminated above or below any layer are not overlapped is overlapped with the part of the decorative layer included in any layer and the part of the first transparent layer or the part of the second transparent layer included in the layer laminated above or below any layer.

According to the above configuration, for example, since the decorative layer and the transparent layer are vertically overlapped, it is possible to suppress a possibility (an overlapping ratio) that the light reflection layer will be overlapped above or below the decorative layer. Also, when the decorative layer and the transparent layer are vertically overlapped, even if the transparent ink is mixed with the ink forming the decorative layer, for example, it is possible to implement a desired decoration. For this reason, according to this configuration, it is possible to more appropriately model the three-dimensional object having the desired decoration, for example.

Configuration 8

The method for forming a three-dimensional object further uses a flattening unit configured to flatten a top surface of the three-dimensional object being modeled, wherein the head for transparent ink is configured to eject the ink droplets of the transparent ink onto the decorative ink of the decorative layer, and wherein the flattening unit is configured to flatten at least the layer of the transparent ink formed on the decorative ink.

According to the above configuration, for example, it is possible to perform the forming with higher precision by performing the flattening with the flattening unit. Also, in this case, since the layer of the transparent ink formed on the decorative ink is flattened, it is possible to appropriately prevent the decorative ink from being mixed with the other inks upon the flattening. For this reason, according to this configuration, for example, it is possible to more appropriately flatten the three-dimensional object being modeled.

In the meantime, as the flattening unit, a roller may be favorably used, for example. Also, the flattening unit is configured to flatten the ink layer by removing a part of the ink before the curing. For example, when performing the forming by using the ultraviolet curable ink, the flattening unit flattens the ink layer by removing a part of the ink before ultraviolet irradiation.

Also, in the above configuration, the head for decorative ink and the head for transparent ink are disposed to be positionally offset in the sub-scanning direction, such as the stagger arrangement. In this case, for example, the head for transparent ink is configured to eject the transparent ink onto the cured decorative ink, for example. Also, the flattening unit is configured to flatten an area in which the decorative ink is cured and the transparent ink is not cured yet, for example. According to this configuration, for example, it is possible to more appropriately perform the flattening only for the transparent ink. Thereby, for example, it is possible to appropriately flatten the ink layer while more securely preventing the decorative ink from being mixed with the other inks.

Configuration 9

A width of the transparent layer formed between the light reflection layer and the decorative layer in a direction perpendicular to a surface layer of the three-dimensional object is 150 μm or less. According to this configuration, for example, it is possible to suppress the influence caused by an excessive width of the transparent layer as well as appropriately prevent the ink having light reflectivity and the decorative ink from being mixed with each other. The influence caused by an excessive width of the transparent layer may refer to decrease of color density as viewed from the outside of the three-dimensional object, and so on, for example.

Configuration 10

There is provided a method for forming a three-dimensional object, the method using a head for reflective ink, which is an inkjet head configured to eject ink droplets of an ink having light reflectivity and is configured to form a light reflection layer, which is a layer of the ink having the light reflectivity; a head for decorative ink, which is an inkjet head configured to eject ink droplets of a decorative ink, which is an ink for decoration for the three-dimensional object, and is configured to form a decorative layer, which is a layer of the decorative ink, and a head for transparent ink, which is an inkjet head configured to eject ink droplets of a transparent ink, which is an ink of a transparent color, and is configured to form a transparent layer, which is a layer of the transparent ink. The method includes enabling the head for reflective ink, the head for decorative ink and the head for transparent ink to perform: a main scanning operation of relatively moving to the three-dimensional object being modeled in a preset main scanning direction and ejecting the ink droplets, and a sub-scanning operation of relatively moving to the three-dimensional object being modeled in a sub-scanning direction perpendicular to the main scanning direction, wherein at least the head for decorative ink and the head for transparent ink are arranged to be positionally offset in the sub-scanning direction, and wherein the transparent layer is formed between the light reflection layer and the decorative layer by using the head for reflective ink, the head for decorative ink and the head for transparent ink, so that the decorative layer, the transparent layer and the light reflection layer are formed in corresponding order from a surface layer-side of the three-dimensional object towards an inner side thereof. The method for forming a three-dimensional object can be said as a manufacturing method of the three-dimensional object. According to the above configuration, it is possible to accomplish the same effects as the configuration 1.

According to the disclosure, for example, it is possible to appropriately model the three-dimensional object having a desired decoration.

BRIEF DESCRIPTION OF THE DRAWINGS

FIGS. 8A to 8D are perspective views depicting modified embodiments of the three-dimensional object of the disclosure.

DETAILED DESCRIPTION OF THE EMBODIMENTS

Hereinafter, a three-dimensional object that is to be formed by an apparatus for forming a three-dimensional object according to an illustrative embodiment of the disclosure and a modeling method (manufacturing method) thereof will be described with reference to FIGS. 1 to 8D. The three-dimensional object can be formed using an apparatus for forming a three-dimensional object of which configurations will be described later with reference to FIGS. 12 to 14. In below descriptions, the three-dimensional object that is to be formed by the apparatus for forming a three-dimensional object is also referred to as a three-dimensional object of the illustrative embodiment.

The three-dimensional object is an example of a three-dimensional object that is to be formed by a lamination method and a surface thereof is decorated (a character, an mage and the like are recorded with colors). More specifically, the three-dimensional object is a structure three-dimensionally formed by a lamination method (lamination modeling method) of laminating a plurality of layers. Also, in illustrative embodiments, an example where a modeling is performed by an inkjet method using an inkjet head is described.

[1] Configuration of Three-Dimensional Object

Figure 1:
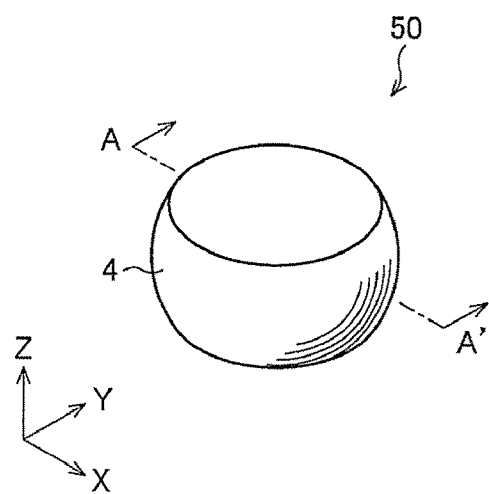
FIG. 1 is a perspective view depicting an outward appearance of a three-dimensional object according to an illustrative embodiment of the disclosure.

FIG. 1 is a perspective view depicting an outward appearance of a three-dimensional object 50 according to an illustrative embodiment. The three-dimensional object 50 of the illustrative embodiment has a substantially cylindrical shape of which a side is curved and bulgy. In the meantime, the shape of the three-dimensional object of the disclosure and the shape of the three-dimensional object to be manufactured by the manufacturing method of the disclosure are not limited to the shape shown in FIG. 1. For example, the disclosure can be applied to all shapes such as a spherical shape, a hollow structure, a ring structure, a horseshoe shape and the like, in addition to a hexahedral shape (which will be described later).

According to one of characteristic configurations of the disclosure, in the illustrative embodiment, a second transparent layer, a coloring layer (decorative layer) formed by an ink (decorative ink) including colorant, a first transparent layer formed by a transparent ink and a light reflection layer formed by an ink having light reflectivity are formed in corresponding order from a surface layer-side (outer periphery-side) of the three-dimensional object 50 towards an inner side (central part-side). In FIG. 1, a second transparent layer 4 formed of the transparent ink and positioned at an outermost surface layer-side of the three-dimensional object 50 on the curved side of the three-dimensional object 50 is seen.

Figure 2:
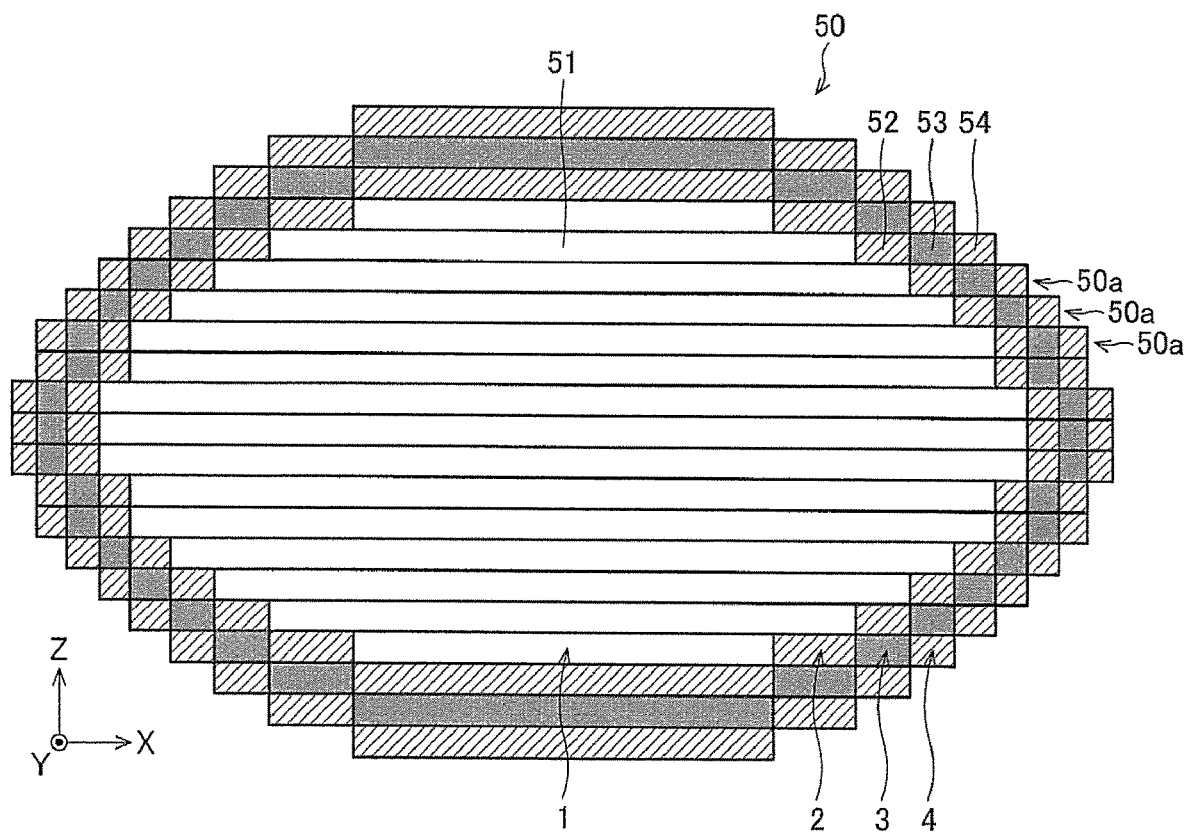
FIG. 2 is a sectional view taken along a line A-A' of FIG. 1.

FIG. 2 is a sectional view taken along a line A-A' of FIG. 1. The section of the three-dimensional object 50 shown in FIG. 2 is a section taken along an XZ plane at a central position of the three-dimensional object 50 in an XYZ coordinate system shown in FIG. 1.

In the illustrative embodiment shown in FIG. 2, the three-dimensional object 50 three-dimensionally formed by laminating 21 (twenty one) layers 50a in a Z direction is shown, for example. In the meantime, the number of the layers is not limited to 21 (twenty one).

[2] Configuration of Each Layer to be Laminated

Figure 5:
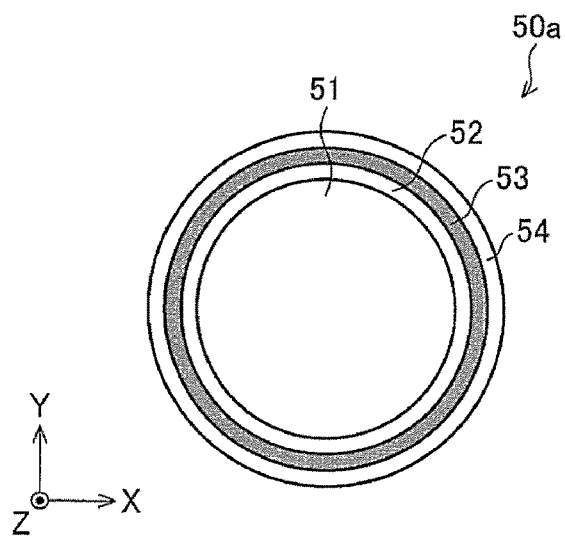
FIG. 5 is a top view of the three-dimensional object shown in FIG. 1 during the manufacturing process.

The XY plane of one layer 50a positioned at a central stage is shown in FIG. 5. In each layer 50a, a part 54 of the second transparent layer, a part 53 of the coloring layer, a part 52 of the first transparent layer and a part 51 of the light reflection layer are formed in corresponding order from the outer periphery-side towards the central part-side. That is, it can be said that the three-dimensional object 50 of the illustrative embodiment is coated with a first transparent layer 2, a coloring layer 3 and a second transparent layer 4 in corresponding order from a light reflection layer 1, which is a main body of the three-dimensional object, towards the surface layer-side (outer periphery-side). Also, a thickness of one layer of the layer 50a in the Z direction (vertical direction in FIG. 2) is within a range of 5 μm to 50 μm, which is appropriate to form the coloring layer 3 with a plurality of colors by the subtractive color process. For example, when forming a layer with an ultraviolet curable ink by the inkjet method, a preferable range of the thickness is 10 μm to 25 μm.

In the illustrative embodiment, the light reflection layer 1 is regarded as the main body of the three-dimensional object. However, the light reflection layer may or may not belong to the main body of the three-dimensional object. That is, a main body or hollow space of the three-dimensional object separate from the light reflection layer may be provided at a central part of the three-dimensional object, and the light reflection layer, the first transparent layer, the coloring layer and the second transparent layer may be formed in corresponding order from the main body (which may not have the light reflectivity) of the three-dimensional object towards the surface layer-side (outer periphery-side). Alternatively, a core part (which may not have the light reflectivity) and the light reflection layer 1 formed on a surface thereof may be regarded as the main body of the three-dimensional object.

As shown in FIG. 2, the plurality of layers 50a is laminated in the Z direction, so that the parts 54 of the second transparent layers of the respective layers 50a are connected substantially in the outermost surface direction of the three-dimensional object 50 to form the second transparent layer 4. Also, the parts 53 of the coloring layers of the respective layers 50a are connected substantially in the outermost surface direction of the three-dimensional object 50 to form the coloring layer 3. Also, the parts 52 of the first transparent layers of the respective layers 50a are connected substantially in the outermost surface direction of the three-dimensional object 50 to form the first transparent layer 2. Also, the parts 51 of the light reflection layers of the respective layers 50a are connected substantially in the outermost surface direction of the three-dimensional object 50 to form the light reflection layer 1.

By the above arrangement, when the surface of the three-dimensional object 50 is seen from all directions of X, Y and Z directions, since the second transparent layer, the coloring layer, the first transparent layer and the light reflection layer are formed in corresponding order, it is possible to recognize a color tone expressed by the subtractive color process.

In the meantime, a size of the part 52 of the first transparent layer in the XY plane direction is set to be slightly greater than a size of the part 53 of the coloring layer to which the part 52 of the first transparent layer is to be contacted in the upper-lower direction. Thereby, it is possible to more securely prevent the inks, which configure the coloring layer 3 and the light reflection layer 1, from being mixed.

Also, a size of the part 54 of the second transparent layer in the XY plane direction is set to be slightly greater than a size of the part 53 of the coloring layer to which the part 54 of the second transparent layer is to be contacted in the upper-lower direction. Thereby, it is possible to more securely protect the coloring layer 3.

A width of the three-dimensional object 50 along the Z direction (hereinafter, referred to as a thickness in the Z direction. Also, it can be referred to as a height in the Z direction) is not particularly limited, and the thickness (height) of the layer 50a in the Z direction can also be appropriately set by the number of laminations. Also, as described later, in the illustrative embodiment, the lamination is made using the inkjet method. Therefore, it is preferably to consider the thickness of the layer 50a in the Z direction that can be implemented in the lamination method. For example, when forming a layer with the ultraviolet curable ink (which will be described later) by the inkjet method, the thickness of the layer 50a is 5 μm to 20 μm, depending on sizes of ink droplets. However, when the three-dimensional object has a large size and a resolution is not particularly required, a plurality of layers may be laminated with the same data and the larger ink droplets may be favorably used. In this case, therefore, it is possible to reduce a data amount and to increase a modeling speed.

[3] Configuration of Light Reflection Layer 1 (Part 51 of Light Reflection Layer)

The light reflection layer 1 (the part 51 of the light reflection layer) is a layer formed of inks having light reflectivity, and has the light reflectivity capable of reflecting the light over the entire range of the visible light at least on a coloring layer-side surface of the light reflection layer 1.

Specifically, the light reflection layer 1 (the part 51 of the light reflection layer) may be formed of an ink including metallic powders or an ink including a white pigment, and is preferably formed of a white ink. When the light reflection layer 1 is formed of the white ink, it is possible to favorably reflect the light incident from the surface layer-side of the three-dimensional object at the light reflection layer 1 and to implement the coloring by the subtractive color process.

In the illustrative embodiment, the main body of the three-dimensional object is configured by the light reflection layer 1. However, when forming the light reflection layer 1 on a surface of a separate main body of the three-dimensional object, which may not have the light reflectivity, a thickness of the light reflection layer 1, i.e., a width along a center-side direction from an outer periphery-side of the part 51 of the light reflection layer (refer to FIG. 2) (hereinafter, referred to as a thickness of the light reflection layer 1) may be set to minimum 5 μm to 20 μm. In the meantime, the disclosure is not limited to the numerical value range.

[4] Configuration of First Transparent Layer 2 (Part 52 of First Transparent Layer)

The first transparent layer 2 (the part 52 of the first transparent layer) is formed of a transparent ink.

Here, the transparent ink may be an ink capable of thrilling a transparent layer of which light transmittance per unit thickness is equal to or greater than 50%. When the light transmittance per unit thickness of the transparent layer is less than 50%, the transmission of light is unfavorably interrupted, so that the three-dimensional object cannot express a desired color tone by the subtractive color process. Preferably, an ink of which light transmittance per unit thickness of the transparent layer is equal to or greater than 80%, more preferably 90%, is used.

The first transparent layer 2 (the part 52 of the first transparent layer) is arranged between the light reflection layer 1 (the part 51 of the light reflection layer) and the coloring layer 3 (the part 53 of the coloring layer), so that it is possible to avoid the mixing of the coloring ink forming the coloring layer 3 and the ink forming the light reflection layer 1. Even if the coloring ink forming the coloring layer is mixed with the transparent ink forming the first transparent layer, since a color of the coloring layer is not lost, a change, which is not favorable to the color tone, is not caused. Therefore, it is possible to implement a three-dimensional object which a desired color tone (decoration) is expressed in the coloring layer 3.

A width of the part 52 of the first transparent layer along a center-side direction from an outer periphery-side (hereinafter, referred to as a thickness of the first transparent layer) may be set to minimum 5 μm to 20 μm in a decorative part of the plane perpendicular to the lamination direction. In the meantime, the disclosure is not limited to the numerical value range.

[5] Configuration of Coloring Layer 3 (Part 53 of Coloring Layer)

The coloring layer 3 (the part 53 of the coloring layer) is formed of a coloring ink including colorant.

The ink including colorant (hereinafter, also referred to as coloring ink) includes light-colored inks of yellow (Y), magenta (M), cyan (C) and black (K). However, the disclosure is not limited thereto, and inks of red (R), green (G), blue (B) and orange (Or) may be added. Also, inks of metallic, pearl and fluorescent colors may be used. In order to express a desired color tone, one or more of the coloring inks are used.

An amount of the coloring ink, which is to be used to form the coloring layer 3 (the part 53 of the coloring layer), is not uniform depending on the desired (expressed) color tone. For this reason, in case of the bright color tone of a low density, it may not possible to meet an ink filling density of the coloring layer 3 to a predetermined ink filling density only with the coloring ink, an unevenness may be formed in the Z direction, and recesses in which there is no coloring ink may be formed in the X and Y directions. Any of the cases is not preferable because an unfavorable unevenness is formed in a three-dimensional object that is to be formed by the lamination method, like the illustrative embodiment. In particular, on a vertical modeling surface in the vicinity of the middle of the lamination structure shown in FIG. 2, the ink formation is made by an error diffusion method, one section of the coloring layer 3 has the ink filling density of four droplets (two ink droplets in the vertical and horizontal directions, respectively), and the number of the coloring ink is 4 droplets at a maximum (highest density) and zero at a minimum (density is zero, i.e., white). Therefore, a gap space equivalent to the four droplets is formed at the minimum density. That is, the quality of the modeling surface and the color tone is highly deteriorated.

Therefore, in the illustrative embodiment, the ink filling density of the coloring layer 3 (the part 53 of the coloring layer) is supplemented by a supplement ink at a place where an ink filling density of the coloring layer 3 (the part 53 of the coloring layer) does not satisfy a predetermined ink filling density only with the coloring ink. That is, the coloring layer 3 (the part 53 of the coloring layer) is formed so that a summed density (the number of ink droplets) of the coloring ink and the supplement ink is constant. Thereby, it is possible to avoid the occurrence of the recesses and to compactly model the shape of the three-dimensional object 50.

Since an ejection amount of the coloring ink and a spotting position of the ink of each color configured by the coloring ink are already known, it is possible to determine a supplement amount and a supplement position (spotting position) of the supplement ink, taking into consideration the same. The determination may be made in an inkjet head apparatus 10 or another control apparatus (not shown). In this way, it is possible to minimize the supplement amount, thereby reducing an ink amount to be removed.

Also, the ink filling density is supplemented by the supplement ink, so that a surface to be formed by the coloring layer 3 is flattened and is thus made to be shiny.

The supplement ink is preferably an ink that does not exert a bad influence on the color tone, which is to be expressed in the coloring layer 3 (the part 53 of the coloring layer). For example, the transparent ink that is used for the first transparent layer 2 (the part 52 of the first transparent layer) and the second transparent layer 4 (the part 54 of the second transparent layer) may be adopted.

A thickness of the coloring layer 3, i.e., a width along a center-side direction from an outer periphery-side of the part 53 of the coloring layer (refer to FIG. 2) (hereinafter, referred to as a thickness of the coloring layer 3) may be set to minimum 5 μm to 20 μm.

In the illustrative embodiment, the descriptions are made on the basis of the coloring layer 3. However, the disclosure is not limited to the coloring layer, and there is no particular limit inasmuch as the layer is a decorative layer.

[6] Configuration of Second Transparent Layer 4 (Part 54 of Second Transparent Layer)

The second transparent layer 4 (the part 54 of the second transparent layer) is formed using the transparent ink described with respect to the first transparent layer 2 (the part 52 of the first transparent layer). In the meantime, the second transparent layer 4 and the first transparent layer 2 may be formed using the same type of the transparent ink or the different types of the transparent inks.

A thickness of the second transparent layer 4, i.e., a width along a center-side direction from an outer periphery-side of the part 54 of the second transparent layer (refer to FIG. 2) (hereinafter, referred to as a thickness of the second transparent layer 4) may be set to 10 μm to 100 μm.

The second transparent layer 4 functions as a protective layer of the coloring layer 3, and enables the three-dimensional object to be compactly manufactured in the disclosure (the illustrative embodiment) adopting the lamination method.

That is, if the coloring layer 3 configures the outermost layer of the three-dimensional object 50, i.e., if the part 53 of the coloring layer in each layer 50a shown in FIG. 2 is located at an outermost end portion, the coloring layer 3 (the part 53 of the coloring layer) may not be formed with high precision. However, like the illustrative embodiment, the second transparent layer 4 (the part 54 of the second transparent layer) is formed at the outermost layer of the three-dimensional object 50, so that the coloring layer 3 (the part 53 of the coloring layer) is formed with high precision. Therefore, the second transparent layer 4 (the part 54 of the second transparent layer) can attribute to the desired color tone.

Also, if the coloring layer 3 configures the outermost layer of the three-dimensional object 50, since the coloring layer 3 is exposed, the discoloring due to the friction and the color degradation due to ultraviolet rays are likely to occur. However, like the illustrative embodiment, the second transparent layer 4 (the part 54 of the second transparent layer) is formed at the outermost layer of the three-dimensional object 50, so that the discoloring and the color degradation can be prevented.

[7] Method of Manufacturing Three-Dimensional Object

Figure 3:
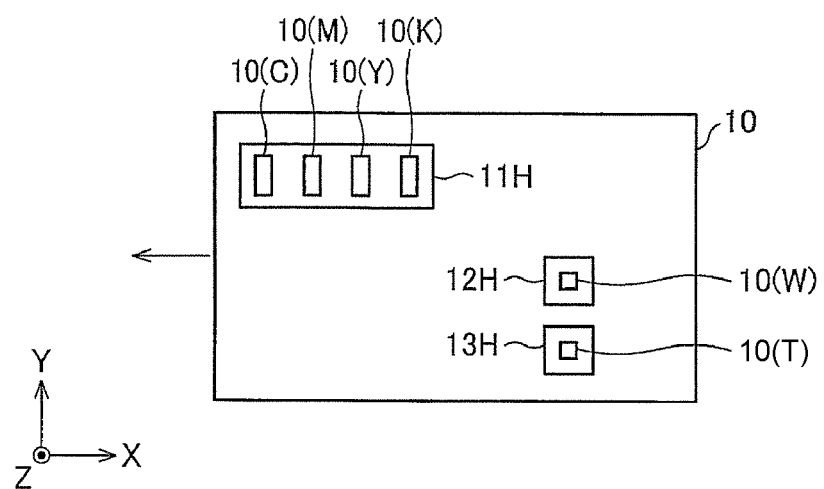
FIG. 3 is a pictorial view of a nozzle hole-side of an inkjet head that is to be used to manufacture the three-dimensional object shown in FIG. 1.

Subsequently, a method of manufacturing the three-dimensional object 50 of the illustrative embodiment is described. FIG. 3 depicts a lower surface of the inkjet head apparatus 10 that is to be used for the manufacturing method. FIGS. 4A to 4D pictorially depict a state in the manufacturing process of the three-dimensional object 50 of the illustrative embodiment.

The inkjet head apparatus 10 is provided on its lower surface with three inkjet heads 11H to 13H. As shown in FIG. 3, the first inkjet head 11H, and the second inkjet head 12H and the third inkjet head 13H are offset in the X direction as regards the arrangement positions thereof. Also, as shown in FIG. 3, the first inkjet head 11H, the second inkjet head 12H and the third inkjet head 13H are offset in the Y direction as regards the arrangement positions thereof. That is, the inkjet heads 11H to 13H are provided side by side in a so-called stagger arrangement.

The first inkjet head 11H is provided with a nozzle 10(C) for cyan ink configured to eject a cyan ink, a nozzle 10(M) for magenta ink configured to eject a magenta ink, a nozzle 10(Y) for yellow ink configured to eject a yellow ink and a nozzle 10(K) for black ink configured to eject a black ink. In the meantime, an arrangement order and number of the respective nozzles 10(C), 10(M), 10(Y) and 10(K) are not limited to FIG. 3. The inks that are to be ejected from the nozzles are all the coloring inks that are to be used to form the coloring layer 3 (the part 53 of the coloring layer) shown in FIG. 2.

The second inkjet head 12H is provided with a nozzle 10(W) for white ink configured to eject a white ink (W). The white ink (W) is the ink that is to be used to form the light reflection layer 1 (the part 51 of the light reflection layer) shown in FIG. 2.

The third inkjet head 13H is provided with a nozzle 10(T) for transparent ink configured to eject a transparent ink (T). The transparent ink (T) is the ink that is to be used to form the first transparent layer 2 (the part 52 of the first transparent layer) and the second transparent layer 4 (the part 54 of the second transparent layer) shown in FIG. 2.

The inkjet head apparatus 10 is provided so that the lower surface shown in FIG. 3 faces the layer 50a being formed. Also, the inkjet head apparatus 10 is configured to reciprocally move in the X direction and to eject the inks during the movement. Also, when the inkjet head apparatus 10 is moved in a predetermined direction in the XYZ coordinate system or a side of a formation stand (a formation surface B of the formation stand is shown in FIGS. 4A to 4D) on which the layer 50a is placed is moved in a predetermined direction in the XYZ coordinate system, relative positions of the inkjet head apparatus 10 and the layer 50a being formed are changed. Any of the inkjet head apparatus 10 and the stand may be moved.

Here, each ink is an ultraviolet curable ink. Therefore, it is necessary to irradiate the ejected ink with ultraviolet rays. An ultraviolet irradiator may be mounted to the inkjet head apparatus 10 or may be configured as a separate member. When the ink is irradiated with ultraviolet rays, the ink is cured, so that each layer 50a shown in FIG. 2 is formed.

In the below, a manufacturing process of the three-dimensional object 50, which is to be performed using the inkjet head apparatus 10, is described with reference to FIGS. 4A to 4D.

First, a first layer 50a (described as a first layer 50a(1)) is formed on the formation surface B of the formation stand.

In the forming (manufacturing) process of the first layer 50a(1), the respective inks are ejected at predetermined timings from the inkjet head apparatus 10 by using the inkjet method, so that a part of the second transparent layer, a part of the coloring layer, a part of the first transparent layer and a part of the light reflection layer are formed in corresponding order from an end portion-side of the first layer 50*a*(1) towards a center-side.

The forming (manufacturing) process of the first layer 50*a*(1) is described in detail with reference to FIGS. 4A to 4C.

Figure 4A:
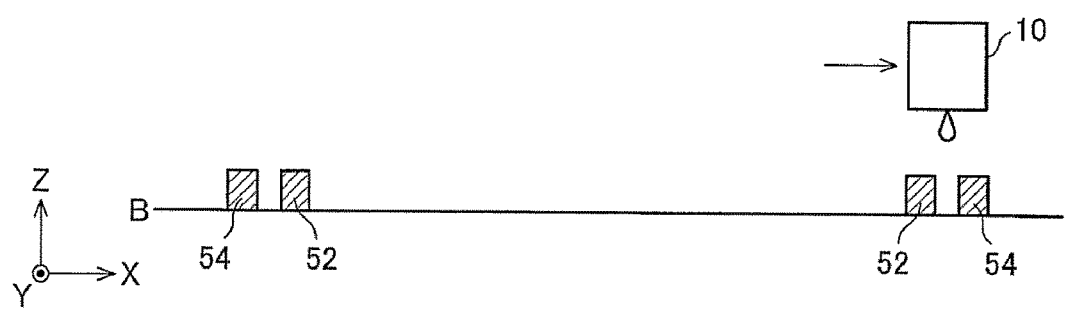
FIGS. 4A to 4D depict a manufacturing process of the three-dimensional object shown in FIG. 1.
Figure 4B:
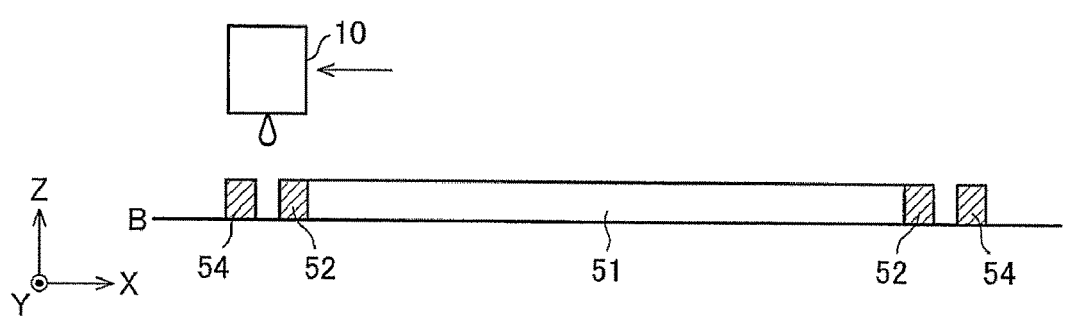
Figure 4C:
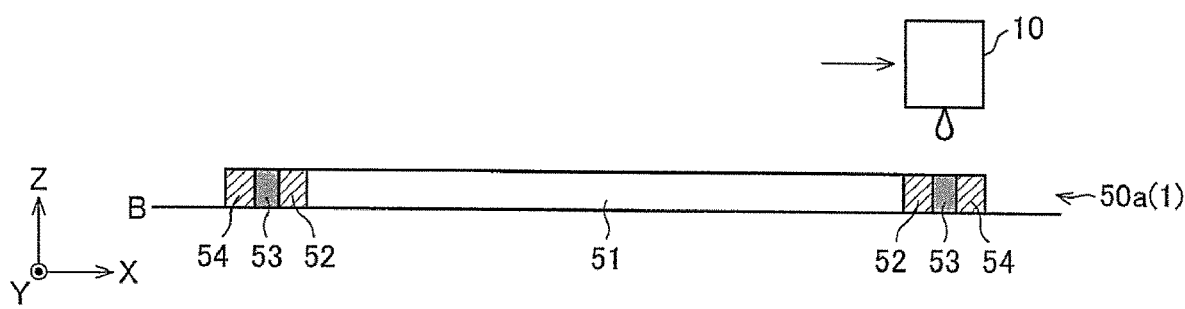

In step S1 of FIG. 4A, the part 54 of the second transparent layer is formed using the transparent ink and the part 52 of the first transparent layer is formed using the transparent ink. In this process, while the inkjet head apparatus 10 is moved in a positive direction along the X axis, the transparent ink is ejected at predetermined timings from the nozzle 10(T) for transparent ink shown in FIG. 3 and is spotted to a position becoming the part 54 of the second transparent layer and a position becoming the part 52 of the first transparent layer, so that ink banks of the transparent ink are formed. The ink banks are then cured by irradiating with ultraviolet rays. Thereby, the part 52 of the first transparent layer and the part 54 of the second transparent layer are formed, as shown in FIG. 4A.

Subsequently, in step S2 of FIG. 4B, while the inkjet head apparatus 10 is moved in a negative direction along the X axis, the white ink (W) as the ink having light reflectivity is ejected at a predetermined timing from the nozzle 10(W) for white ink to form an ink bank, which is then irradiated with ultraviolet rays and is thus cured. Thereby, the part 51 of the light reflection layer is formed, as shown in FIG. 4B.

Subsequently, in step S3 of FIG. 4C, while the inkjet head apparatus 10 is moved in the positive direction along the X axis, the ink for coloring layer formation consisting of the coloring ink and the supplement ink is ejected at a predetermined timing so that a total amount of both inks is constant, and is then cured by ultraviolet rays. Here, the predetermined timing is a timing at which each nozzle of the first inkjet head 11H is located at a position in an area between the part 52 of the first transparent layer and the part 54 of the second transparent layer formed in step S1, to which the ink for coloring layer formation can be ejected. At this timing, the ink droplets of a preset amount are ejected using the inkjet method, so that an ink bank is formed. The ink bank is irradiated with ultraviolet rays and is thus cured. Thereby, as shown in FIG. 4C, the part 53 of the coloring layer having a desired color tone is formed between the part 52 of the first transparent layer and the part 54 of the second transparent layer.

Through steps S1 to S3, the first layer 50*a*(1) is completed. The first layer 50*a*(1) has the same aspect as the top view of the layer 50*a* shown in FIG. 5. In the meantime, the order of step S1 and step S2 may be reversed. Also, the order of step S2 and step S3 may be reversed.

When the first layer 50*a*(1) is completed, a new layer 50*a* (described as a second layer 50*a*(2)) is formed (laminated) on the first layer 50*a*(1).

Here, as shown in FIG. 2, the three-dimensional object 50 of the illustrative embodiment is configured so that sizes (areas) of the layers 50*a* along the XY plane, which are to be laminated from the lowest stage of a laminated structure to a middle stage, gradually increase. Like this, when manufacturing the three-dimensional object 50 having a shape of which a size of the section increases along the lamination direction by using the inkjet method, an end portion of the upper layer 50*a* being laminated protrudes laterally beyond an end portion of the lower layer 50*a* already formed. In order to form the protruding structure, a support material layer is preferably formed.

Figure 4D:
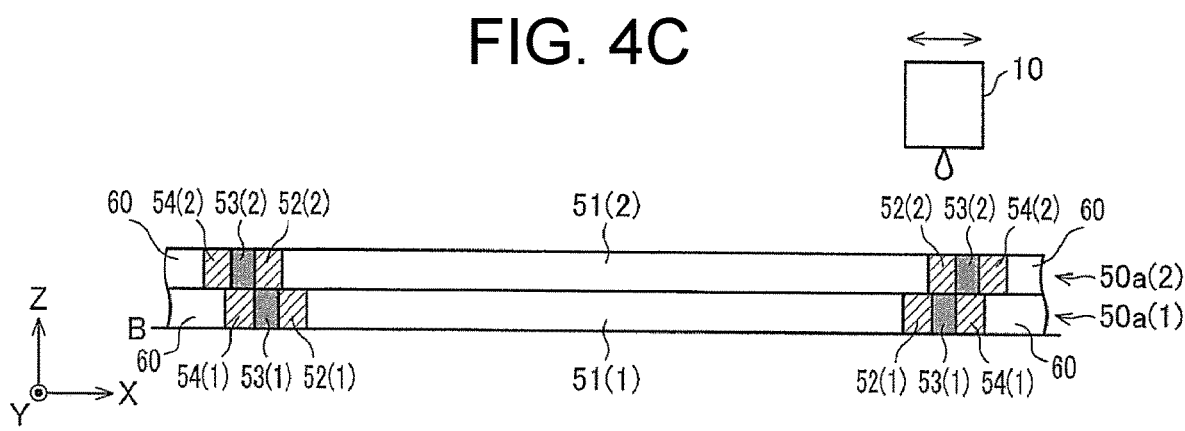

Although steps for forming the second layer 50*a*(2) are shown in FIG. 4D, the part 53(2) of the coloring layer included in the second layer 50*a*(2) is formed to be superimposed on the part 54(1) of the second transparent layer of the first layer 50*a*(1). Like this, since the second layer 50*a*(2) has the greater size (area) than the first layer 50*a*(1) along the XY plane, the part 54(2) of the second transparent layer configuring the end portion of the second layer 50*a*(2) protrudes laterally beyond the part 54(1) of the second transparent layer configuring the end portion of the first layer 50*a*(1). Therefore, a support material 60 is formed at an outermore side (a more lateral side) than the part 54(1) of the second transparent layer of the first layer 50*a*(1) so that the ink to be deposited to a protruding part is not dropped below the protruding part when forming the protruding part.

The support material 60 is preferably formed of an ink that is to be ejected using the inkjet method. The support material 60 has such strength that even when a layer is formed on the support material, the layer is not dropped. However, since the support material 60 is not included in the final three-dimensional object 50, the support material 60 consists of the removable ink. The ink of the support material 60 is preferably cured by ultraviolet rays (it is cured so that it can be removed in a subsequent process) or is a water-soluble and can be removed by water in a subsequent process.

In this way, the processing of laminating the layer 50*a* is repeatedly performed in the X and Y directions to form one layer, and the lamination is repeated in the Z direction, so that the three-dimensional object 50 shown in FIG. 2 can be manufactured. In the meantime, when forming one layer, it is possible to obtain a favorable modeling or decoration having less non-uniformity by performing a well-known interlace scanning, which is a two-dimensional image formation.

The manufacturing method of the illustrative embodiment includes the process of forming the part 54 of the second transparent layer by using the transparent ink, the process of forming the part 53 of the coloring layer by using the coloring ink, the process of forming the part 52 of the first transparent layer by using the transparent ink, and the process of forming the part 51 of the light reflection layer by using the ink having light reflectivity, wherein after performing the process of forming the part 52 of the first transparent layer and the process of forming the part 54 of the second transparent layer, the process of forming the part 53 of the coloring layer by using the coloring ink is performed, and the part 53 of the coloring layer is formed between the part 52 of the first transparent layer and the part 54 of the second transparent layer. Thereby, the part 54 of the second transparent layer functions as an outer moat of the ink banks configuring the coloring layer when forming the part 53 of the coloring layer. Therefore, there is no concern that the inks configuring the coloring layer unfavorably diffuse. As a result, it is possible to form the part 53 of the coloring layer with high precision.

Figure 6:
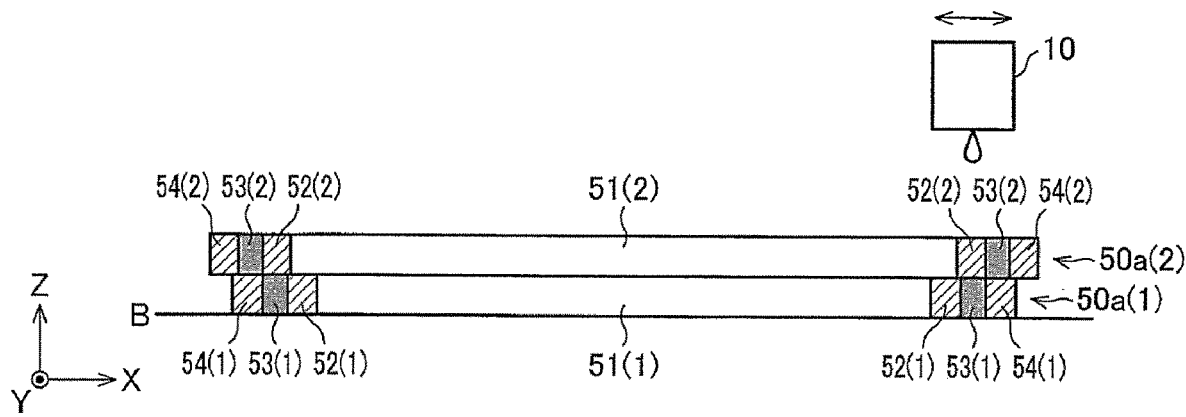
FIG. 6 is a partial sectional view of the three-dimensional object for illustrating merits of the three-dimensional object shown in FIG. 1.
Figure 7:
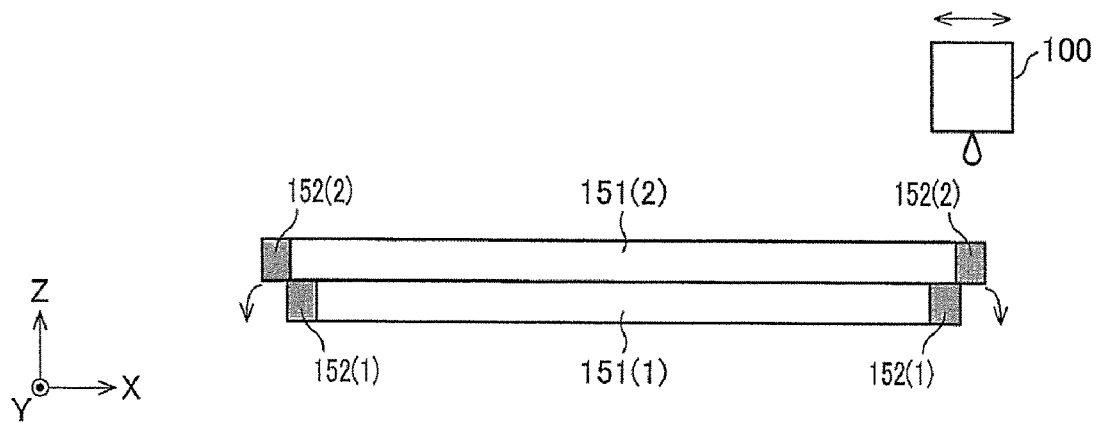
FIG. 7 is a partial sectional view of a three-dimensional object having a comparative configuration.

The additional merits of the formation of the part 54 of the second transparent layer are described with reference to FIGS. 6 and 7. FIG. 6 depicts a part of the three-dimensional object 50 of the illustrative embodiment, in which the support material is removed from FIG. 4D. FIG. 7 is a sectional view of a three-dimensional object having a comparative configuration. The three-dimensional object having a comparative configuration is the same as the three-dimensional object 50 of the illustrative embodiment, in that it is formed by the lamination method. However, each layer of the comparative configuration does not have parts equivalent to the part 52 of the first transparent layer and the part 54 of the second transparent layer in the three-dimensional object

50 of the illustrative embodiment. That is, the three-dimensional object having a comparative configuration has an aspect where the coloring layer is directly coated to the light reflection layer. Also in this comparative configuration, while assuming that the upper layer has the greater size (area) than the lower layer along the XY plane, problems that are to occur in the comparative configuration are described.

In the comparative configuration of FIG. 7, an end portion of an upper layer is configured by a coloring layer 152(2), and the coloring layer 152(2) protrudes laterally beyond a coloring layer 152(1) configuring an end portion of a lower layer. For this reason, when ejecting the ink for configuring the coloring layer so as to form the protruding part, there is a concern that the ink will be dropped below a coloring position.

The color tone of the three-dimensional object is expressed by the coloring layer. Therefore, if the ink configuring the coloring layer is dropped, the color tone of the three-dimensional object may be changed from a predetermined color tone.

In the meantime, the three-dimensional object 50 of the illustrative embodiment shown in FIG. 6 has the part 54 of the second transparent layer at the end portion of each layer 50a. In FIG. 6, even if the ink configuring the part 54 of the second transparent layer is dropped, it does not influence the color tone because the color tone is determined by the coloring layer. Therefore, according to the illustrative embodiment, it is possible to manufacture the highly reliable three-dimensional object 50 having a desired color tone.

The other merits are described. For example, when the part 54 of the second transparent layer is formed in the first layer 50a(1), it is possible to secure a wide formable range (permitted formation area) of the coloring layer to be included in the second layer 50a(2). Thereby, the strictness of the manufacturing precision is somewhat relieved, so that it is possible to improve the manufacturing efficiency.

In the meantime, the merit that the wide formable area can be secured can also be obtained even when the part 54 of the second transparent layer is formed later than the part 53 of the coloring layer. Therefore, the disclosure includes an aspect where the part 54 of the second transparent layer is formed later than the part 53 of the coloring layer.

Also, according to the three-dimensional object 50 of the illustrative embodiment, the surface of the coloring layer 3 is coated by the second transparent layer 4. Therefore, the second transparent layer 4 also functions as a protective layer of the coloring layer 3.

In the meantime, in FIGS. 4A to 4D, the layer having the greater size (area) than the lower layer along the XY plane is laminated. It can be said that the configuration relates to the manufacturing of a lower half structure when the three-dimensional object 50 of FIG. 1 is bisected into two upper and lower structures.

When the three-dimensional object 50 of FIG. 1 is bisected into two upper and lower structures, the above-described manufacturing method can be applied to the upper half structure, too. However, as shown in FIG. 2, when manufacturing the upper half structure of the three-dimensional object 50, the coloring layer of the upper layer is provided to be closer to the center-side of the layer 50a than the coloring layer of the lower layer, the part 53 of the coloring layer of the upper layer is superimposed on the part 52 of the first transparent layer of the lower layer. Also, the part 54 of the second transparent layer of the upper layer is superimposed on the part 53 of the coloring layer of the lower layer.

Also, as shown in FIG. 2, in the upper half structure of the three-dimensional object 50, the lower layer has a greater size (area) than a layer to be laminated along the XY plane. For this reason, there is little concern that the ink configuring the coloring layer of the upper layer will be dropped. In the meantime, when manufacturing the upper half structure, the support material may not be formed.

In the meantime, the three-dimensional object of the illustrative embodiment shown in FIG. 2 has such a structure that a layer consisting of the part 52 of the first transparent layer, the part 53 of the coloring layer and the part 54 of the second transparent layer, a layer consisting of the part 53 of the coloring layer and the part 54 of the second transparent layer and a layer consisting the part 54 of the second transparent layer are laminated in the layers of the lowest stage and the vicinity thereof and the layers of the highest stage and the vicinity thereof. In this lamination structure, it is possible to implement a structure where the entire surface of the three-dimensional object is covered with the second transparent layer 4, the coloring layer 3 and the first transparent layer 2. However, the disclosure is not limited thereto. For example, like a lamination structure of FIG. 9 (which will be described later), the second transparent layer, the coloring layer and the first transparent layer may not be included on the upper and lower surfaces of the three-dimensional object.

[8] Modified Embodiments

Modified Embodiment 1

It can be said that the three-dimensional object 50 of the illustrative embodiment has the first transparent layer 2, the coloring layer 3 and the second transparent layer 4 formed along the surface shape of the light reflection layer 1. However, the disclosure is not limited thereto. For example, shapes of the three-dimensional object shown in FIGS. 8A to 8D are also possible.

In the shapes of the three-dimensional object shown in FIGS. 8A to 8D, the second transparent layer 4 is formed to have a desired shape including therein the three-dimensional object (the structure consisting of the coloring layer 3, the first transparent layer and the light reflection layer in the above-described illustrative embodiment) by using the configuration where the end portion of each layer 50a (FIG. 2) is the part 54 of the second transparent layer, rather than the shape of the second transparent layer 4 formed along the surface shape of the light reflection layer 1, as shown in each of FIGS. 8A to 8D.

The aspect that the second transparent layer 4 includes the three-dimensional object, like the modified embodiment 1, is favorably implemented for a structure where the three-dimensional object is mechanically weak. That is, the corresponding aspect is effective when forming legs and wings of a bug, a stem and a petal of a flower, and the like. When making a creature or a plant as a specimen or decoration, the creature or plant can be naturally kept, as it lives, by capturing and modeling the same with a three-dimensional scanner. Also, since the support material is not required, the useless waste material is not generated. That is, the modified embodiment 1 is a nature-friendly system.

The three-dimensional object shown in FIG. 8A has a structure where the second transparent layer 4 configures a hexahedral structure and a spherical structure consisting of the coloring layer 3, the first transparent layer and the light reflection layer is provided therein. The entire structure shown in FIG. 8A can be manufactured by using the same manufacturing method as FIGS. 4A to 4D.

The three-dimensional object 50 shown in FIG. 8B is a standing-type three-dimensional object 50 in which the second transparent layer 4 includes therein a doll consisting of the coloring layer 3, the first transparent layer and the light reflection layer and the second transparent layer 4 can self-support the entire three-dimensional object. The standing-type three-dimensional object 50 can also be manufactured by using the above-described manufacturing method.

The three-dimensional object 50 shown in FIG. 8C is a strap-type three-dimensional object 50 in which the second transparent layer 4 includes therein a doll consisting of the coloring layer 3, the first transparent layer and the light reflection layer and a hole 70 is formed in a part of the second transparent layer 4. The corresponding three-dimensional object is implemented as a strap or a key holder that is to be attached to a mobile phone, for example. While an outward appearance of the hole 70 is formed with the second transparent layer 4, the hole is preferably formed in a part of the second transparent layer 4. When the hole is formed in the second transparent layer 4, it is not necessary to form a hole in the doll consisting of the coloring layer 3, the first transparent layer and the light reflection layer.

The three-dimensional object 50 shown in FIG. 8D has a structure where the second transparent layer 4 includes therein an upper half part of a doll consisting of the coloring layer 3, the first transparent layer and the light reflection layer and a decorative three-dimensional image 71 configured by a mark, a frame, a light color and the like is formed on a surface of the second transparent layer 4 or in the second transparent layer 4. Also, the three-dimensional object 50 has a character area 72 for recording a character such as a date, a personal name, a place name and the like on the surface of the second transparent layer 4 or in the second transparent layer 4. The decorative three-dimensional image 71 and the character area 72 may be formed at the same time as the outward appearances are formed with the second transparent layer 4. In the meantime, the disclosure is not limited to the decorative three-dimensional image 71 and the character area 72, and the other additional information may be formed on the surface of the second transparent layer 4 or in the second transparent layer 4.

In the meantime, in FIGS. 8A to 8D, the unitary doll is included by the second transparent layer 4. However, the number of the dolls to be included by the second transparent layer 4 is not limited thereto.

In the meantime, when the three-dimensional object of the disclosure has a ring shape, the coloring layer may be provided not only in the vicinity of an outer peripheral end portion of the ring but also in the vicinity of an inner peripheral end portion. For example, the coloring layer may be provided on the surface of the three-dimensional object, and the second transparent layer may be provided on the coloring layer.

Also, instead of the configuration where the second transparent layer 4 is made to have a desired shape, like this modified embodiment, the second transparent layer 4 may be formed to have a shape conforming to the surface shape of the light reflection layer 1, like the above illustrative embodiment, and the obtained three-dimensional object may be sealed in a resin having an arbitrary shape.

Modified Embodiment 2

Figure 9:
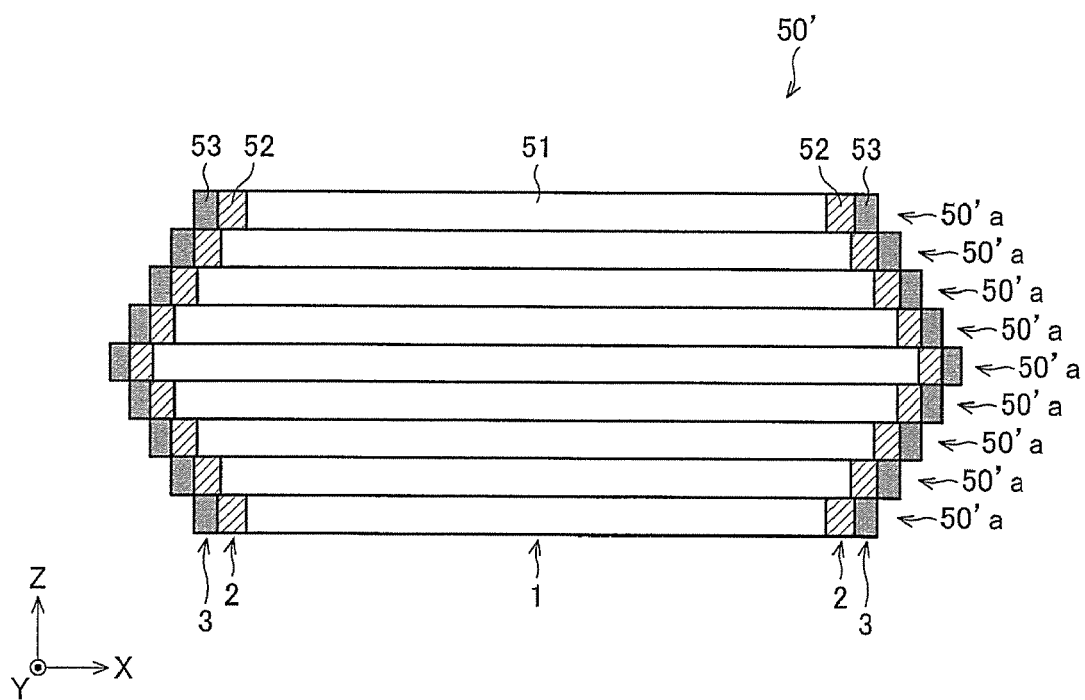
FIG. 9 is a sectional perspective view depicting another illustrative embodiment of the three-dimensional object of the disclosure.
Figure 10:
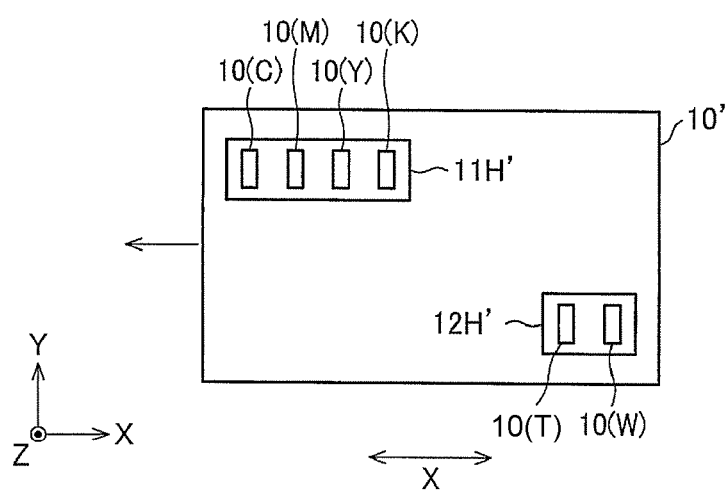
FIG. 10 is a pictorial view of a nozzle hole-side of an inkjet head that is to be used to manufacture the three-dimensional object shown in FIG. 9.

In the three-dimensional object 50 of the illustrative embodiment, the second transparent layer 4 forms the outermost layer. However, the object of the disclosure can be accomplished inasmuch as the first transparent layer is formed between the coloring layer and the light reflection layer. For this reason, a three-dimensional object 50' shown in a sectional view of FIG. 9 can also be an illustrative embodiment of the disclosure. In the below, a modified embodiment 2 is described with reference to FIGS. 9 to 11D. FIG. 9 is a sectional view of the three-dimensional object 50' of the modified embodiment 2, and corresponds to FIG. 2. FIG. 10 is a pictorial view depicting a lower surface of an inkjet head apparatus that is to be used to manufacture the three-dimensional object 50' of the modified embodiment 2. FIGS. 11A to 11D depict a manufacturing process of the three-dimensional object 50' of the modified embodiment 2.

The three-dimensional object 50' of the modified embodiment 2 is different from the three-dimensional object 50 of the above illustrative embodiment, in that the second transparent layer 4 formed at the outermost layer of the three-dimensional object 50 of the above illustrative embodiment is not arranged in the three-dimensional object 50' of the modified embodiment 2 and the coloring layer 3 configures the outermost layer.

Each layer 50'a configuring the three-dimensional object 50' of the modified embodiment 2 shown in FIG. 9 does not have the part 54 of the second transparent layer, which is arranged at the end portion of the layer 50a (FIG. 2) of the illustrative embodiment.

Also in the three-dimensional object 50' shown in FIG. 9, since the part 52 of the first transparent layer is formed between the part 53 of the coloring layer and the part 51 of the light reflection layer in each layer 50'a, it is possible to avoid the mixing of the coloring ink included in the part 53 of the coloring layer and the ink configuring the part 51 of the light reflection layer. Even if the coloring ink included in the part 53 of the coloring layer is mixed with the transparent ink configuring the part 52 of the first transparent layer, a change that is not favorable to the color tone of the part 53 of the coloring layer is not caused. Therefore, it is possible to implement the three-dimensional object where a desired color tone is expressed in the coloring layer.

A method of manufacturing the three-dimensional object 50' shown in FIG. 9 is described. The three-dimensional object 50' shown in FIG. 9 may be manufactured using an inkjet head apparatus 10' shown in FIG. 10, for example.

Two inkjet heads 11H' and 12H' are mounted on a lower surface of the inkjet head apparatus 10' shown in FIG. 10. As shown in FIG. 10, the first inkjet head 11H' and the second inkjet head 12H' are offset in the X direction as regards the arrangement positions thereof and are also offset in the Y direction as regards the arrangement positions thereof.

The first inkjet head 11H' is the same as the first inkjet head 11H shown in FIG. 3.

The second inkjet head 12H' is provided with the nozzle 10 (W) for white ink configured to eject the white ink (W), which is to be used to form the light reflection layer 1 (the part 51 of the light reflection layer), and the nozzle 10(T) for transparent ink configured to eject the transparent ink (T).

In the below, a process of manufacturing the three-dimensional object 50' by using the inkjet head apparatus 10' is described with reference to FIGS. 11A to 11D.

Figure 11A:
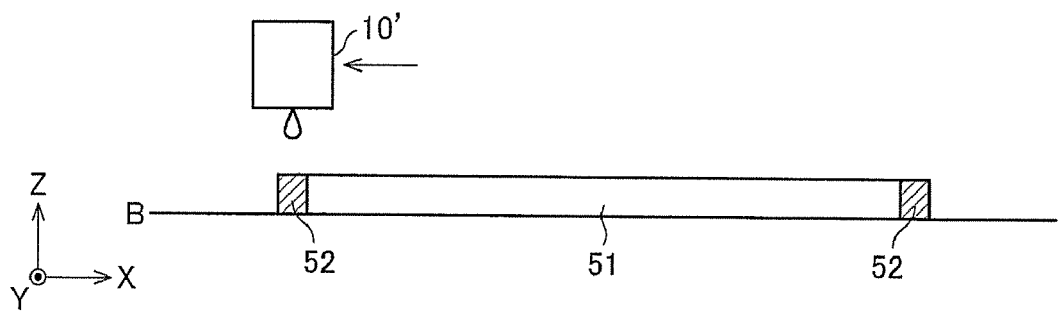
FIGS. 11A to 11D depict a manufacturing process of the three-dimensional object shown in FIG. 9.

In step S1' shown in FIG. 11A, the part 52 of the first transparent layer is formed using the transparent ink and the part 51 of the light reflection layer is formed using the white ink (W). In this process, while the inkjet head apparatus 10' is moved in the negative direction along the X axis, the transparent ink is ejected at a predetermined timing from the nozzle 10(T) for transparent ink and the white ink (W) is ejected at a predetermined timing from the nozzle 10(W) for white ink, so that the respective inks are spotted to positions becoming the part 52 of the first transparent layer and the part 51 of the light reflection layer and form the ink banks. The ink banks are then cured by ultraviolet rays. Thereby, the part 52 of the first transparent layer and the part 51 of the light reflection layer are formed, as shown in FIG. 11A.

Subsequently, in step S2' shown in FIG. 11B, while the inkjet head apparatus 10' is moved in the positive direction along the X axis, the ink for coloring layer formation including the coloring ink is ejected at a predetermined timing and is spotted to a position becoming the part 53 of the coloring layer, so that the ink banks are formed. The ink banks are then cured by irradiating with ultraviolet rays.

Through steps S1' and S2', any layer 50'a is completed. In the meantime, the support material 60 described in the illustrative embodiment is formed in the modified embodiment 2, too.

Figure 11B:
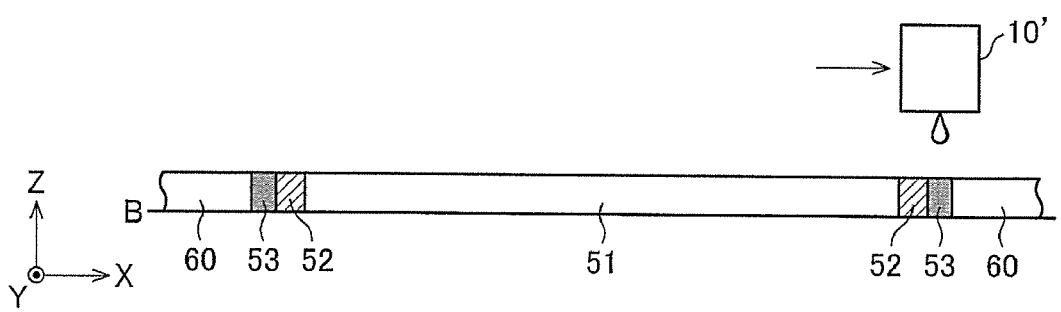

When the layer 50'a shown in FIG. 11B is completed, the process of forming a new layer 50'a on the layer 50'a shown in FIG. 11B is performed in the same manner as steps S1' and S2'.

Figure 11C:
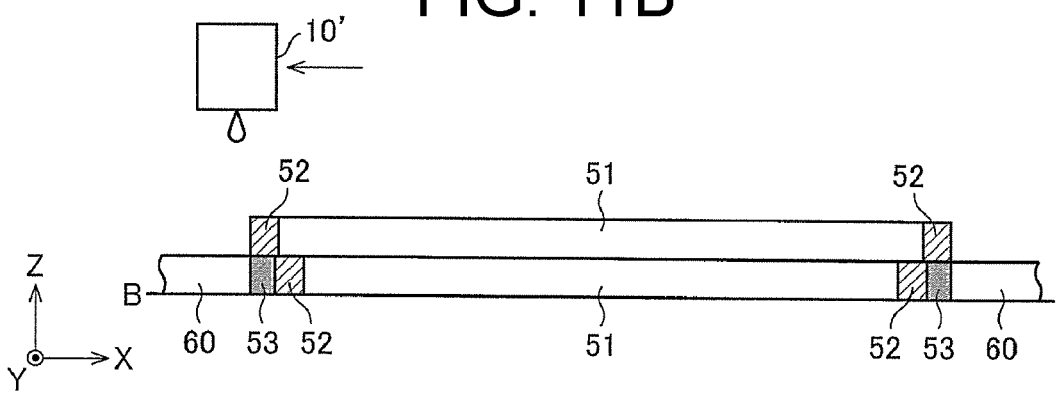

Specifically, in step S3' shown in FIG. 11C, the part 52 of the first transparent layer and the part 51 of the light reflection layer are formed in the same manner as step S1'. In step S3', it is necessary to form the upper layer 50'a so that a size (area) thereof along the XY plane is greater than the lower layer 50'a, as described in the illustrative embodiment. Therefore, as shown in FIG. 11C, the transparent ink is spotted so that the part 52 of the first transparent layer included in the upper layer 50'a is superimposed on the part 53 of the coloring layer included in the lower layer 50'a completed in step S2'. At the same time, the white ink (W) is spotted so that the part 51 of the light reflection layer included in the upper layer 50'a is superimposed on the part 51 of the light reflection layer and the part 52 of the first transparent layer included in the lower layer 50'a. Thereby, the ink banks are formed and are then cured by ultraviolet rays.

Figure 11D:
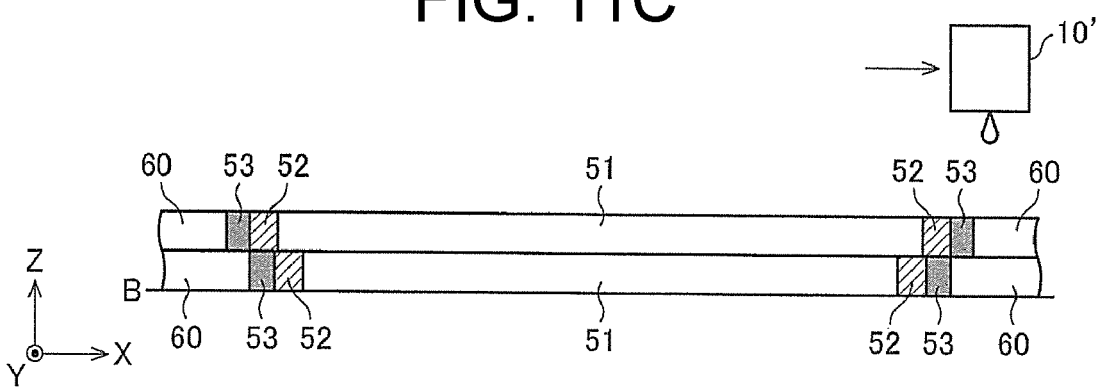

Subsequently, in step S4' shown in FIG. 11D, the ink for coloring layer formation is ejected at a predetermined timing in the same manner as step S1' and is spotted to the position becoming the part 53 of the coloring layer, so that the ink banks are formed. The predetermined timing is a timing at which the ink for coloring layer formation can be ejected to an outer side of the part 52 of the first transparent layer included in the upper layer 50'a, which is not superimposed on the part 53 of the coloring layer included in the lower layer 50'a. The formed ink banks are then irradiated with ultraviolet rays for curing, so that the part 53 of the coloring layer to be included in the upper layer 50'a is formed.

By repeating the processing of laminating the layer 50'a in this way, it is possible to manufacture the three-dimensional object 50' shown in FIG. 9.

[9] Apparatus for Forming Three-Dimensional Object

In the above, the operations of forming the three-dimensional object 50 have been described as the operations of the inkjet head apparatus 10 having the inkjet head mounted thereto. However, upon the actual modeling, it is considered to model the three-dimensional object 50 by using an apparatus for forming a three-dimensional object further having a variety of configurations, in addition to the inkjet head. In the below, examples of the configuration of the apparatus for forming a three-dimensional object that is to be used in the illustrative embodiment are described in detail.

Figure 12:
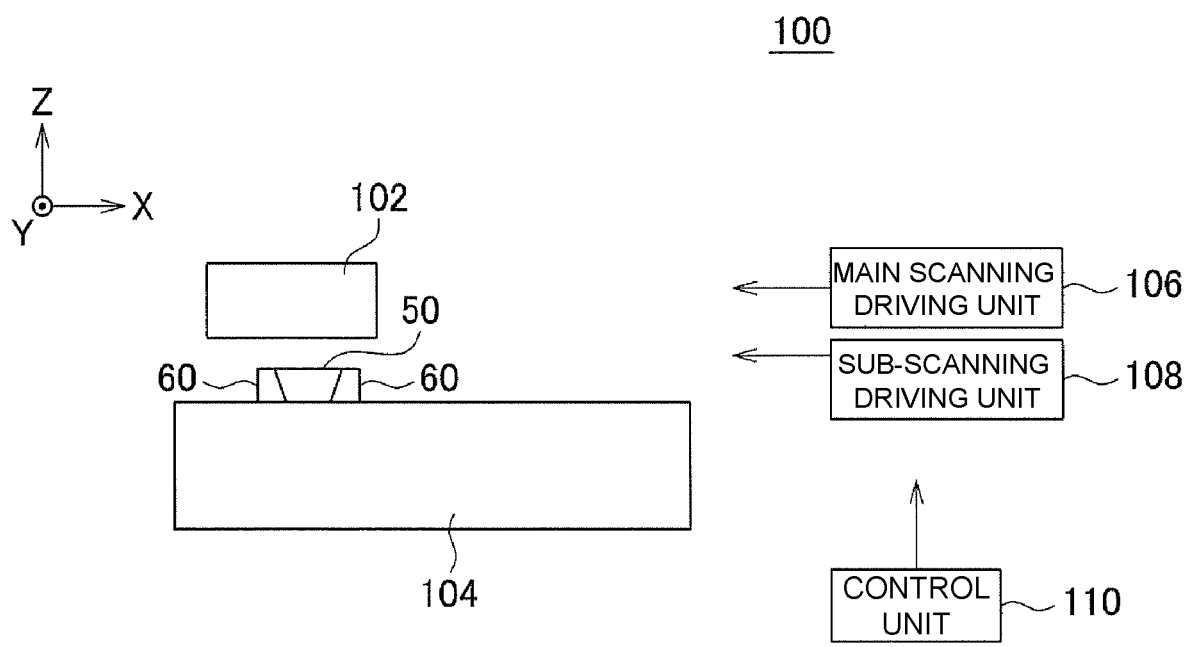
FIG. 12 depicts an example of a configuration of an apparatus for forming a three-dimensional object configured to model a three-dimensional object in an illustrative embodiment.

FIG. 12 depicts an example of a configuration of an apparatus 100 for forming a three-dimensional object configured to model the three-dimensional object 50 of the illustrative embodiment. In the meantime, for convenience of descriptions, the configuration of the apparatus 100 for forming a three-dimensional object shown in FIG. 12 is referred to as this example and the like.

The apparatus 100 for forming a three-dimensional object is an apparatus configured to model the three-dimensional object 50 by a lamination modeling method, and includes a head unit 102, a stand unit 104, a main scanning driving unit 106, a sub-scanning driving unit 108 and a control unit 110. In this case, the lamination modeling method is a method of performing the modeling by overlapping and laminating a plurality of ink layers, for example.

In the meantime, as the ink for forming each layer, it is considered to use a curable ink that is to be cured depending on a predetermined condition. More specifically, in this example, the three-dimensional object 50 is modeled using an ultraviolet curable ink that is to be cured by ultraviolet irradiation. Also, the modeling method of this example is the same as or similar to the manufacturing method of the three-dimensional object described with reference to FIGS. 1 to 11D, except for following features.

The head unit 102 is a unit configured to eject ink droplets of inks becoming the materials of the three-dimensional object and the support material. In this case, the ink is liquid becoming a material of the three-dimensional object and the support material. Also, in this example, the head unit 102 has a plurality of inkjet heads disposed in a stagger arrangement. In the meantime, the head unit 102 may be a unit equivalent to the inkjet head apparatus 10 or the inkjet head apparatus 10' described with reference to FIGS. 1 to 11D. Also, the more specific configuration of the head unit 102 will be described later.

The stand unit 104 is a stand-shaped member configured to hold the three-dimensional object 50 being modeled. In this example, the stand unit 104 is configured to support the three-dimensional object 50 at a position facing the head unit 102 by placing the three-dimensional object 50 surrounded by the support material 60 on an upper surface thereof. Also, the stand unit 104 is configured to move in each of X, Y and Z directions shown in the drawings, in response to the control of the control unit 110, for example. Thereby, the stand unit 104 changes a relative position of the three-dimensional object 50 to the head unit 102, as required.

The main scanning driving unit 106 is a driving unit configured to enable the inkjet heads of the head unit 102 to perform a main scanning operation. In this case, the main scanning operation is an operation of ejecting the ink droplets with relatively moving to the three-dimensional object being modeled in a preset main scanning direction (X direction in FIG. 12). Also, the sub-scanning driving unit 108 is a driving unit configured to enable the inkjet heads of the head unit 102 to perform a sub-scanning operation. In this case, the sub-scanning operation is an operation of relatively moving to the three-dimensional object being modeled in the sub-scanning direction (Y direction in FIG. 12) perpendicular to the main scanning direction.

In the meantime, the main scanning driving unit 106 and the sub-scanning driving unit 108 are configured to enable the inkjet heads of the head unit 102 to perform the main scanning operation and the sub-scanning operation by fixing one of the head unit 102 and the stand unit 104 and moving the other, for example. More specifically, upon the main scanning operation, it is considered to fix a position of the stand unit 104 and to move the head unit 102, for example. Also, upon the sub-scanning operation, it is considered to fix a position of the head unit 102 and to move the stand unit 104. Also, upon the main scanning operation and the sub-scanning operation, the configuration as regards the movement may be reverse to the above configuration. Also, for example, both the head unit 102 and the stand unit 104 may be moved, as required.

The control unit 110 is a CPU of the apparatus 100 for forming a three-dimensional object, for example, and is configured to control operations of the respective units of the apparatus 100 for forming a three-dimensional object. According to this example, it is possible to appropriately model the three-dimensional object 50 by the lamination modeling method, for instance.

In the meantime, the apparatus 100 for forming a three-dimensional object may have the same or equivalent configuration as or to a well-known apparatus for forming a three-dimensional object (for example, 3D printer), except for the above and below configurations. For example, the apparatus 100 for forming a three-dimensional object further has a driving unit configured to perform a scanning operation in the vertical direction (Z direction in FIG. 12) perpendicular to the main scanning direction and the sub-scanning direction, although the corresponding driving unit is not shown. The scanning operation in the Z direction is a scanning operation for keeping a distance between a modeling surface of the three-dimensional object 50 and the head unit 102 within a predetermined range, and at least one of the head unit 102 and the stand unit 104 is moved in the Z direction whenever forming each layer configuring the three-dimensional object 50. Also, the distance between the modeling surface of the three-dimensional object 50 and the head unit 102 is thereby adjusted.

Figure 13:
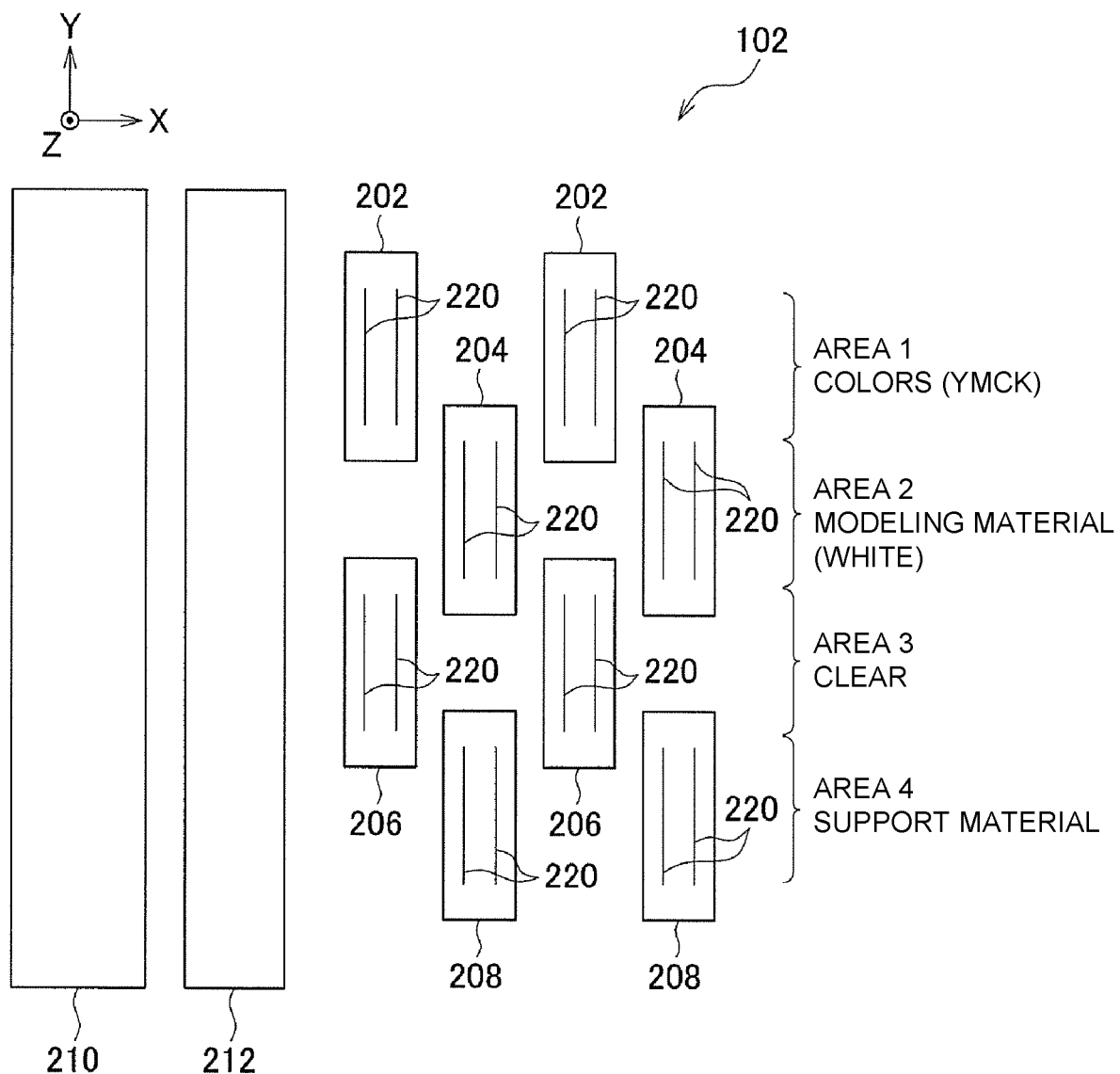
FIG. 13 depicts an example of a specific configuration of a head unit.

Subsequently, the configuration of the head unit 102 of this example is described in more detail. FIG. 13 depicts an example of the specific configuration of the head unit 102. In this example, the head unit 102 has a plurality of inkjet heads disposed in the stagger arrangement, an ultraviolet irradiation unit 210 and a flattening roller 212. Also, as the plurality of inkjet heads, a plurality of (two) heads 202 for color ink, a plurality of (two) heads 204 for modeling material, a plurality of (two) heads 206 for transparent ink, and a plurality of (two) heads 208 for support material, are respectively provided.

In the meantime, in this example, each inkjet head has two nozzle lines 220. The nozzle line 220 is a line of which a plurality of nozzles is arranged side by side in the sub-scanning direction. The number of the nozzle lines 220 in each inkjet head may be one or three or more lines. Also, each inkjet head is configured to eject the ink droplets of the ultraviolet curable ink from the respective nozzles of the nozzle lines 220.

Also, the stagger arrangement is a configuration where the nozzle line 220 of each inkjet head is arranged in a direction of 45° to 135° (mainly, 90°) relative to the main scanning direction and the plurality of inkjet heads is arranged in two or more lines with respect to the main scanning direction. In this case, the direction of the nozzle line 220 is a direction in which a plurality of nozzles of the nozzle line 220 is aligned side by side. Also, in this example, the direction of the nozzle line 220 of each inkjet head is the sub-scanning direction perpendicular (90°) to the main scanning direction, as described above.

More specifically, in the head unit 102 of this example, the head unit is divided into four areas (denoted as areas 1 to 4 in FIG. 13), and the inkjet heads having a predetermined utility (function) are arranged in each area. By performing the main scanning operation in plural times with the sub-scanning operation being interposed therebetween, the ink droplets are sequentially ejected to each position of the three-dimensional object from the inkjet heads in the area of one side with respect to the sub-scanning direction. In this case, in this example, the ink droplets are sequentially ejected from the inkjet heads of the area 1, for instance.

In the meantime, each of the areas 1 to 4 has the configuration as shown in FIG. 13 and the inkjet heads having different utilities are arranged therein, as described later. For example, as shown in FIG. 13, in the area 1, the plurality of (two) heads 202 for color ink is arranged side by side in the main scanning direction. In the area 2, the plurality of (two) heads 204 for modeling material is arranged side by side in the main scanning direction. In the area 3, the plurality of (two) heads 206 for transparent ink is arranged side by side in the main scanning direction. In the area 4, the plurality of (two) heads 208 for support material is arranged side by side in the main scanning direction. Also, the configuration of the inkjet heads arranged in each area is not limited to the configuration shown in FIG. 13, and may be appropriately different depending on the quality required for the three-dimensional object.

The head 202 for color ink is an example of the head for decorative ink. In this case, the head for decorative ink is an inkjet head configured to eject ink droplets of a decorative ink, which is an ink for decoration for the three-dimensional object, thereby forming a decorative layer that is a layer of the decorative ink. Also, in this example, the head 202 for color ink is configured to eject the ink droplets of the coloring ink, which is an example of the decorative ink, thereby forming the coloring layer, which is an example of the decorative layer, and coloring the three-dimensional object. In this case, the coloring ink is a color ink (coloring ink) such as yellow (Y), magenta (M), cyan (C) and black (K).

Also, as described above, in this example, each head 202 for color ink has two nozzle lines 220. For this reason, the number of the nozzle lines 220 in the two heads 202 for color ink is four in total. In this case, it is considered to eject the ink droplets of respective colors of yellow, magenta, cyan and black, which are coloring process colors, from each of the four nozzle lines 220. By this configuration, it is possible to appropriately perform the coloring for the three-dimensional object.

The head 204 for modeling material is an inkjet head configured to eject ink droplets of a modeling material, which is an ink for modeling, and is configured to laminate a layer of the modeling material, thereby forming an area for modeling at least in the three-dimensional object. Also, in this example, as the modeling material, the white ink, which is an example of the ink having light reflectivity, is used. As the white ink, an ink including a white pigment may be favorably used, for example.

Also, in this example, the white ink is used as the ink for modeling, so that the head 204 for modeling material functions as a head for reflective ink, too. In this case, the head for reflective ink is an inkjet head configured to eject the ink droplets of the ink having light reflectivity, thereby forming a light reflection layer, which is a layer of the ink having light reflectivity, for example. By this configuration, for example, it is possible to favorably reflect the incident light from the surface layer-side of the three-dimensional object via the decorative layer by the light reflection layer. Thereby, it is also possible to appropriately perform the coloring by the subtractive color process, for example.

In the meantime, in a modified embodiment of the head unit 102, it is considered to use an ink except for the white ink for the head 204 for modeling material. For example, it is considered to use a dedicated ink for modeling for the head 204 for modeling material. In this case, the head unit 102 preferably further has a head for reflective ink, in addition to the head 204 for modeling material. In this case, it is preferably to dispose the plurality of inkjet heads including the head for reflective ink in the stagger arrangement in the head unit 102.

The head 206 for transparent ink is an example of the head for transparent ink, and is configured to eject ink droplets of a clear ink, thereby forming a transparent layer. In this case, the clear ink is an example of the transparent ink, which is the ink having a transparent color. Also, the transparent layer is a layer of the transparent ink. The head 208 for support material is an inkjet head configured to eject ink droplets of an ink becoming the support material 60 (refer to FIG. 12).

The ultraviolet irradiation unit 210 is a light source configured for irradiating ultraviolet rays, and is configured to irradiate an ink layer formed on the modeling surface of the three-dimensional object with ultraviolet rays, thereby curing the ink layer. Also, in this example, the ultraviolet irradiation unit 210 is disposed side by side in the main scanning direction with respect to the arrangement of the inkjet heads consisting of the heads 202 for color ink, the heads 204 for modeling material, the heads 206 for transparent ink and the heads 208 for support material. Also, upon the main scanning operation, the ultraviolet irradiation unit 210 is configured to move in the main scanning direction together with the arrangement of the inkjet heads. Thereby, the ultraviolet irradiation unit 210 cures the ink layer upon the main scanning operation. For this reason, in this example, upon the end of the main scanning operation of the inkjet heads in each of the areas 1 to 4, the ink ejected by the inkjet heads in the area is completely cured.

In the meantime, FIG. 13 depicts the configuration where the ultraviolet irradiation unit 210 is disposed only at one side of the arrangement of the inkjet heads with respect to the main scanning direction, for simple illustration. However, in a modified embodiment of the head unit 102, for example, the ultraviolet irradiation unit 210 may be disposed at both sides of the arrangement of the inkjet heads with respect to the main scanning direction.

The flattening roller 212 is an example of the flattening unit, and is configured to rotate in contact with a lamination surface, which is a surface of the ink to be laminated, thereby flattening a top surface of the three-dimensional object being modeled. As the flattening roller 212, a roller having wettability to the ink before the curing may be favorably used, for example. In this case, the flattening roller 212 is configured to scrape a part of the ink before the curing, thereby flattening the ink layer, for example.

Also, in this example, the flattening roller 212 is disposed between the plurality of inkjet heads disposed side by side in the stagger arrangement and the ultraviolet irradiation unit 210. Thereby, the flattening roller 212 performs the flattening operation for the ink layer before the ink layer is irradiated with ultraviolet rays by the ultraviolet irradiation unit 210.

In the meantime, when modeling the three-dimensional object by using the inkjet heads, the lamination surface may not be normally flat (smooth) due to the influence of the non-uniformity of an ejection amount of the ink droplets from the nozzles. For this reason, it is necessary to flatten the lamination surface by any method. Also, in this case, for example, when the flattening operation is performed after the curing of the ink, there is no method but to scrape the ink, which causes dust and the like. For this reason, the flattening operation is preferably performed before the curing of the ink. In contrast, according to this example, the flattening roller 212 is used, so that it is possible to appropriately flatten the three-dimensional object being modeled.

Subsequently, the arrangement of the inkjet heads in this example is described in more detail. As shown in FIG. 13, in this example, the plurality of inkjet heads of the head unit 102 is disposed in the stagger arrangement. In this case, more specifically, for example, the inkjet heads having the same utility are disposed side by side in the main scanning direction with being positionally aligned in the sub-scanning direction. For example, the plurality of heads 202 for color ink is disposed side by side in the main scanning direction with being positionally aligned in the sub-scanning direction. This is also the same for the plurality of heads 204 for modeling material, the plurality of heads 206 for transparent ink and the plurality of heads 208 for support material.

On the other hand, the inkjet heads having different utilities are disposed with being positionally offset with each other in the sub-scanning direction. More specifically, for example, the head 202 for color ink, the head 204 for modeling material, the head 206 for transparent ink and the head 208 for support material, which are the inkjet heads having different utilities, are disposed with being positionally offset with each other in the sub-scanning direction, as shown in FIG. 13.

By the above configuration, it is possible to appropriately prevent the size of the head unit 102 from being excessively enlarged in the main scanning direction. Thereby, it is also possible to appropriately implement the compact configuration for the apparatus 100 for forming a three-dimensional object.

More specifically, for example, when modeling a three-dimensional object, the inkjet heads having various utilities are used and the plurality of inkjet heads having the same utility is used so as to increase the modeling speed, so that it may be necessary to mount the plurality of the inkjet heads. However, when the plurality of inkjet heads is disposed in an in-line arrangement, if the number of the inkjet heads to be mounted increases, the head unit 102 becomes longer in the main scanning direction, so that a width of the apparatus 100 for forming a three-dimensional object increases. The in-line arrangement indicates an arrangement where the plurality of inkjet heads is disposed side by side in the main scanning direction with being positionally aligned in the sub-scanning direction. In contrast, according to this example, even when the number of the inkjet heads in the head unit 102 is large, it is possible to more compactly configure the apparatus 100 for forming a three-dimensional object.

Also, like this example, when the plurality of inkjet heads of the head unit 102 is disposed in the stagger arrangement, it is possible to differently set the timing, at which the ink droplets are to be ejected to each position of the three-dimensional object, for each of the plurality of inkjet heads configured to eject the different kinds of inks. Thereby, it is also possible to appropriately prevent the mixing of the different kinds of inks, for example.

Also, when the plurality of inkjet heads is disposed in the stagger arrangement, the ejection of the ink droplets by the plurality of inkjet heads is dispersedly performed in the plurality of the main scanning operations. For this reason, in this case, for example, as compared to the configuration where the plurality of inkjet heads is disposed side by side in the in-line arrangement, it is possible to reduce the amount of the ink to be ejected within a predetermined range in each of the main scanning operations.

Here, when the amount of the ink to be ejected within a predetermined range in each of the main scanning operations increases, it is necessary to increase an output of the curing unit configured to cure the ink, for example. More specifically, for example, like this example, when the modeling is performed using the ultraviolet curable ink, it is necessary to use a high-output UV irradiator, for example, as the ultraviolet irradiation unit 210.

However, when the output of the ultraviolet irradiation unit 210 increases, the size of the apparatus also increases and the apparatus cost may largely increase, for example. Also, the problems due to the leakage light are likely to occur. Also, more specifically, for example, when the influence of the leakage light increases, the curing of the ink starts in the vicinity of the nozzles of the inkjet head or in the nozzles, so that the ink may not be ejected or the deflection is likely to occur. Also, when a large amount of the ink is ejected and cured at one time, the cured ink may be polymerized, so that an influence of the cure shrinkage may increase. Also, when the output of the ultraviolet irradiation unit 210 is increased, the ink layer may be deformed due to the generated heat.

In contrast, according to this example, the plurality of inkjet heads is disposed in the stagger arrangement. Thereby, for example, even when many inkjet heads are disposed, it is possible to appropriately reduce the amount of the ink to be ejected within a predetermined range in each of the main scanning operations, as described above. Thereby, it is also possible to appropriately suppress the problems, which are caused when the output of the ultraviolet irradiation unit 210 is increased. More specifically, for example, when performing the modeling by using the ultraviolet curable ink, it is possible to appropriately cure the ink by using the ultraviolet light source having a lower output. Also, it is possible to more appropriately suppress the influence of the cure shrinkage, the deformation due to the heat, and the like.

Also, in this example, since it is possible to reduce the output of the ultraviolet irradiation unit 210, it is possible to favorably use an LED-type light source (UVLED), as the ultraviolet irradiation unit 210, rather than a high-output ultraviolet light source such as a metal halide lamp, for example. In this case, since the directionality of the ultraviolet irradiation increases, it is possible to more appropriately prevent the leakage light, and to irradiate ultraviolet rays only to a place at which the ink is to be laminated, for example. For this reason, according to this configuration, it is possible to more appropriately suppress the ejection problem of the ink droplets due to the leakage light, for example.

Also, in this example, as described above, the ink layer is flattened by the flattening roller 212 during the modeling. However, when performing the flattening by the flattening roller 212, if the plurality of inkjet heads configured to eject the different types of the inks is disposed in the in-line arrangement, for example, the different types of the inks are ejected at the same time and the flattening is performed for the plurality of types of inks not cured yet at the same time in each of the main scanning operations. In this case, the inks are likely to be mixed due to the influence of the flattening operation.

In contrast, in this example, the plurality of inkjet heads is disposed in the stagger arrangement, so that it is possible to differently set the timings, at which the ink droplets are to be ejected to the respective positions of the three-dimensional object, for each of the inkjet heads, for example. Thereby, it is also possible to appropriately prevent the inks from being mixed during the flattening operation, for example. For this reason, according to this example, it is possible to more appropriately perform the flattening operation for the ink layer, for example. Thereby, it is also possible to model the three-dimensional object with higher precision, for example.

Also, since it is possible to prevent the mixing of the inks by the stagger arrangement, it is possible to perform the modeling at higher speed, as compared to the configuration where the in-line arrangement is used, for example. For instance, when the in-line arrangement is used, it may be necessary to perform a plurality of the main scanning operations at the same position of the three-dimensional object, in conformity to the number of the types of the inkjet heads to be used, so as to prevent the mixing of the inks. For instance, like this example, in case that the four types of the inkjet heads, i.e., the head 202 for color ink, the head 204 for modeling material, the head 206 for transparent ink, and the head 208 for support material are used, when the in-line arrangement is used, it is considered to used only one type of the inkjet head in one main scanning operation so as to prevent the mixing of the inks, for example. In this case, it is necessary to perform the main scanning operation four times so as to form an ink layer corresponding to one layer. As a result, the time that is to be consumed for the modeling largely increases.

Also, when the in-line arrangement is used, it is considered to use only some nozzles in the nozzle lines 220 of each inkjet head so as to prevent the mixing of the inks. However, also in this case, since the using efficiency of the nozzles decreases, the time that is to be consumed for the modeling increases.

In contrast, like this example, when the stagger arrangement is used, it is possible to use all the inkjet heads in each of the main scanning operations without considering the mixing of the ink. For this reason, in this case, it is possible to remarkably increase the modeling speed (for example, about four times), thereby considerably reducing the time that is to be consumed for the modeling (for example, about ¼), as compared to the configuration where the in-line arrangement is used.

Subsequently, the ink layer that is to be formed by the apparatus 100 for forming a three-dimensional object is described in more detail. The apparatus 100 for forming a three-dimensional object of this example is configured to form each ink layer configuring the three-dimensional object 50 by the respective inkjet heads of the head unit 102, in the same or similar manner as or to the manner described with reference to FIGS. 1 to 11D, for example. More specifically, for example, the transparent layer is formed between the light reflection layer and the coloring layer by using the head 202 for color ink, the head 204 for modeling material, and the head 206 for transparent ink of the head unit 102, so that the coloring layer, the transparent layer and the light reflection layer are formed in corresponding order from the surface layer-side of the three-dimensional object towards the inner side.

Also, in this example, the coloring layer is an ink layer that is to be formed of the color ink for coloring by the head 202 for color ink. The light reflection layer is an ink layer that is to be formed of the white ink by the head 204 for modeling material. Also, the transparent layer is an ink layer that is to be formed of the clear ink by the head 206 for transparent ink. According to this configuration, for example, since the transparent layer is formed between the coloring layer and the light reflection layer in the three-dimensional object, the white ink, which is an ink having light reflectivity, and the coloring ink are not mixed with each other.

Here, for example, if the white ink and the coloring ink are mixed with each other, the color of the coloring ink is lost, so that a desired color tone cannot be obtained. In contrast, according to the above configuration, even if the clear ink of the adjacent transparent layer is mixed with the coloring ink, the color of the coloring ink is not lost. For this reason, in this case, the decoration of the three-dimensional object is not influenced. Therefore, according to this example, for example, it is possible to appropriately model the three-dimensional object having the desired decoration.

Also, in this example, the transparent layer that is to be formed between the light reflection layer and the coloring layer is an example of the first transparent layer. Also, the head 206 for transparent ink is configured to further form the second transparent layer on the surface layer-side of the coloring layer.

According to this configuration, the second transparent layer is formed on the surface layer-side of the three-dimensional object, so that it is possible to more appropriately protect the surface of the three-dimensional object, for example. More specifically, in this case, the decorative layer is protected by the second transparent layer, so that it is possible to prevent the discoloring due to the friction and the color degradation due to ultraviolet rays, for example. Also, the second transparent layer is formed on the surface layer-side, so that it is possible to form the compact and precise three-dimensional object, for example.

Also, in this example, the head 202 for color ink, the head 204 for modeling material and the head 206 for transparent ink are configured to form a part of the second transparent layer, a part of the coloring layer, a part of the first transparent layer and a part of the light reflection layer in corresponding order from an end portion towards a center-side of each layer of two or more layers of the plurality of layers configuring the three-dimensional object, in the same or similar manner as or to the manner described with reference to FIGS. 1 to 11D. In this case, each layer of the two or more layers has the part of the coloring layer between the part of the first transparent layer and the part of the second transparent layer.

Also, in this case, the three-dimensional object has an area where the layers, each of which has the part of the coloring layer between the part of the first transparent layer and the part of the second transparent layer, are laminated each other. In this area, a part with which the part of the coloring layer included in any layer and the part of the coloring layer included in the layer laminated above or below any layer are not overlapped is overlapped with the part of the coloring layer included in any layer and the part of the first transparent layer or the part of the second transparent layer included in the layer laminated above or below any layer.

According to this configuration, since the coloring layer and the transparent layer are vertically overlapped, for example, it is possible to suppress a possibility (an overlapping ratio) that the light reflection layer will be overlapped above or below the coloring layer. Also, when the coloring layer and the transparent layer are vertically overlapped, even if the transparent ink is mixed with the ink forming the coloring layer, for example, it is possible to implement a desired decoration. For this reason, according to this configuration, it is possible to more appropriately model the three-dimensional object having the desired decoration, for example.

Figure 14:
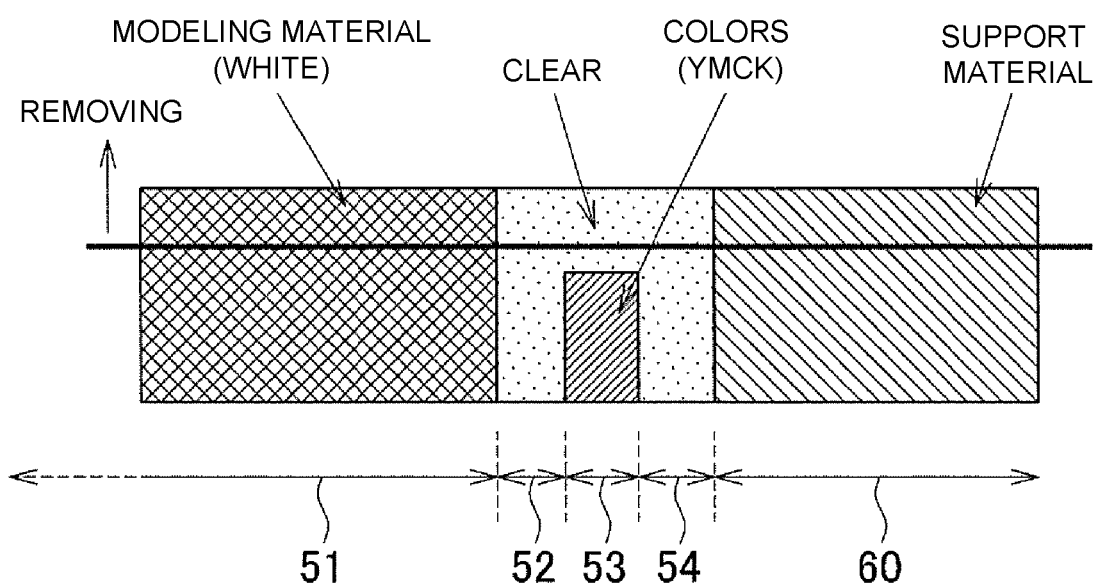
FIG. 14 depicts an example of an ink layer that is to be formed in the illustrative embodiment.

Subsequently, the operation of flattening the ink layer is described in more detail. FIG. 14 depicts an example of the ink layer that is to be formed in this example, and illustrates an example of the configuration for a part of one ink layer that is to be formed during the modeling of the three-dimensional object. In the meantime, in FIG. 14, the configurations having the same reference numerals as FIGS. 1 to 11D have the same or similar features as or to the configuration of FIGS. 1 to 11D, except for features to be described later.

In this example, the respective inkjet heads of the head unit 102 (refer to FIG. 12) are configured to form the part 51 of the light, reflection layer, the part 52 of the first transparent layer, the part 53 of the coloring layer, and the part 54 of the second transparent layer, as the respective ink layers configuring the three-dimensional object 50, in the same manner described with reference to FIGS. 1 to 11D. Also, the area of the support material 60 is formed around the three-dimensional object 50.

Also in this example, the ink filling density of the coloring layer (the part 53 of the coloring layer) is supplemented by the supplement ink at a place where the ink filling density of the coloring layer (the part 53 of the coloring layer) does not satisfy a predetermined ink filling density only with the coloring ink, in the same manner described with reference to FIGS. 1 to 11D. In this case, the clear ink is used as the supplement ink. More specifically, for example, the head 206 for transparent ink (refer to FIG. 13) is configured to supplement the ink filling density of the coloring layer by the clear ink at the place where the ink filling density of the coloring layer does not satisfy the predetermined ink filling density only with the coloring ink.

According to this configuration, for example, it is possible to appropriately supplement the ink filling density of the coloring layer. Thereby, for example, it is also possible to appropriately suppress the unevenness or gap due to the non-uniformity of the ink filling density from being generated in the coloring layer. For this reason, according to this example, it is possible to more appropriately model the three-dimensional object having a desired shape for which the desired decoration has been made, for example Also, as described above with reference to FIG. 13 and the like, the plurality of inkjet heads of the head unit 102 is disposed in the stagger arrangement. Also, in this example, by the configuration of the stagger arrangement, the head 202 for color ink, the head 204 for modeling material, the head 206 for transparent ink and the head 208 for support material eject the ink droplets in corresponding order to the respective ink layers configuring the three-dimensional object and the support material.

In this case, the head 206 for transparent ink is configured to eject the ink droplets of the clear ink, which is to be ejected as the supplement ink, onto the coloring ink of the coloring layer. For this reason, before the flattening is performed by the flattening roller 212 (refer to FIG. 13), the part 53 of the coloring layer is at a state where the clear ink is put on the coloring ink of the color, as shown in FIG. 14.

Also, during the flattening operation, the flattening roller 212 scrapes the ink of a part of the uppermost part of the ink layer, thereby flattening the ink layer. More specifically, in the example of FIG. 14, the flattening roller 212 removes the ink laminated above the line (removal line) shown in FIG. 14, thereby flattening the ink layer. In this case, noticing the part 53 of the coloring layer, the flattening roller 212 flattens the layer of the clear ink formed on the coloring ink.

More specifically, in this example, the operation of removing the laminated ink by the flattening roller 212 is performed at the same time as the ejection of the ink droplets by the respective inkjet heads of the head unit 102, upon the main scanning operation. Also, in this example, the ink droplets are ejected sequentially from the inkjet heads in the area 1 side to the respective areas of the three-dimensional object 50 by the inkjet heads disposed in the respective areas denoted as the areas 1 to 4 in FIG. 13. In this case, the ejection amount of the ink droplets by each inkjet head is set so that a thickness of the ink layer of the part 53 of the coloring layer reaches above the removal line at a timing at which the ink droplets are ejected by the heads 206 for transparent ink disposed in the area 3. For this reason, according to this example, upon the flattening operation, it is possible to flatten the clear ink of the part 53 of the coloring layer, for example. Thereby, it is also possible to perform the flattening by the flattening roller 212 without destroying the state of the coloring ink, for example.

For this reason, according to this example, upon the flattening operation, it is possible to appropriately prevent the coloring ink from being mixed with the other inks, for example. Thereby, it is also possible to more appropriately flatten the three-dimensional object being modeled.

Meanwhile, in this case, the flattening operation by the flattening roller 212 is performed in the other areas at the timing at which the thickness of each ink layer reaches above the removal line. According to this example, it is possible to appropriately flatten each area of the ink layer.

Also, in this example, as shown in FIG. 14, the part 53 of the coloring layer is formed between the part 52 of the first transparent layer and the part 54 of the second transparent layer in the area between the part 51 of the light reflection layer and the support material 60. For this reason, the white ink configuring the part 51 of the light reflection layer, the ink configuring the support material 60 and the coloring ink are not mixed each other.

Also, when the plurality of inkjet heads is disposed side by side in the stagger arrangement, like this example, the ink droplets of the different types of inks are ejected to the respective positions of the three-dimensional object after each of the different types of the inks is cured, without ejecting the ink droplets of the different types of the inks at the same time. For this reason, it is possible to prevent the coloring ink from being mixed with the other inks upon the flattening operation.

Also, in this case, at the timing at which the flattening operation is performed, the coloring ink below the layer of uncured clear ink of the part 53 of the coloring layer is already cured. Therefore, it can also be said that the coloring ink is not mixed during the flattening operation.

Also, regarding the problems that are to occur due to the mixing of the coloring ink with the inks of the other colors, a problem that the lamination surface is matted due to the mixing of the ink for support material with the other inks (for example, the coloring ink and the like) is considered. However, according to this example, it is also possible to appropriately prevent the corresponding problem.

As described above, in this example, the plurality of inkjet heads is disposed in the stagger arrangement, so that it is possible to appropriately suppress the variety of problems, which are caused when the in-line arrangement is used. Also, when the modeling is performed by repeating the main scanning operation and the sub-scanning operation, like this example, it is possible to increase the modeling speed. For this reason, according to this example, it is possible to appropriately improve the modeling speed while suppressing the variety of defects, for example. Thereby, it is also possible to appropriately model the three-dimensional object with high precision, for example.

Also, as described above, the specific arrangement of the inkjet heads in the head unit 102 is not limited to FIG. 13 and may be modified. More specifically, for example, as described above, a dedicated ink for modeling may be used for the head 204 for modeling material and a head for reflective ink may be further used, in addition to the head 204 for modeling material.

Also, the types of the inkjet heads to be arranged in the areas 1 to 4 may be different from FIG. 13. For example, when modeling a three-dimensional object of which a surface is not to be colored, the modeling may be performed without using the coloring ink and the clear ink. In this case, for example, the head 204 for modeling material may be used as the inkjet heads to be arranged in the areas 1, 2, and the head 208 for support material may be used as the inkjet heads to be arranged in the areas 3, 4. Also in this configuration, when the configuration of the stagger arrangement is used, it is possible to appropriately prevent the ink for modeling and the ink for support material from being mixed each other. Thereby, it is also possible to appropriately prevent a sense of the matte, which is caused due to the mixing. For this reason, also with this configuration, it is possible to appropriately model the three-dimensional object with high precision, for example.

Subsequently, a supplementary description regarding the features of the transparent layer formed between the light reflection layer and the coloring layer (the decorative layer) in each of the aforementioned configurations is provided below. First, the effects of forming the transparent layer between the light reflection layer and the coloring layer are described in more detail. This transparent layer is a transparent layer corresponding to the first transparent layer 2, as shown in FIG. 2 and FIG. 9, for example. Moreover, in FIG. 1 to FIG. 14, a part of this transparent layer is also illustrated as the part 52 of the first transparent layer, for example.

As described above, by forming the transparent layer between the light reflection layer and the coloring layer during modeling of the three-dimensional object, it is possible to appropriately prevent the ink configuring the light reflection layer and the ink configuring the coloring layer from being mixed with each other. In the case of modeling a colored three-dimensional object, however, the width of the coloring layer is usually set to a certain degree so as to express the color with sufficient concentration (density). In this case, the width of the coloring layer refers to the width in the direction perpendicular to a surface layer of the three-dimensional object, for example. The surface layer of the three-dimensional object refers to an outermost surface of the three-dimensional object, for example. More specifically, it is considered to set the width of the coloring layer to about 300 μm (e.g. about 250 μm-350 μm), for example. In this case, simply by thinking, it may be considered that even if the ink configuring the light reflection layer and the ink configuring the coloring layer are mixed to a certain degree due to absence of the transparent layer between the light reflection layer and the coloring layer, it should have little influence to the color visually observed from the outside of the three-dimensional object (color of the three-dimensional object).

In contrast thereto, the inventors of the application performed various experiments and found out that if the transparent layer is not formed between the light reflection layer and the coloring layer, the coloring layer having a sufficiently large width may affect the color of the three-dimensional object. More specifically, it was found that, in the case where the transparent layer is not formed between the light reflection layer and the coloring layer, for example, if the three-dimensional object is observed from various angles, the visually observed color changes easily according to the observing angles. In addition, the three-dimensional object was cut to confirm the state of the cross section, and it was confirmed that such change of appearance of the color results from the mixture of the ink configuring the light reflection layer and the ink configuring the coloring layer.

Moreover, through further experiments, the inventors of the application found out that such change of appearance of the color can be appropriately suppressed by forming the transparent layer between the light reflection layer and the coloring layer. That is, by forming the transparent layer between the light reflection layer and the coloring layer, it is possible to appropriately prevent the ink configuring the light reflection layer and the ink configuring the coloring layer from being mixed with each other, and thereby appropriately prevent the visually observed color from changing according to the angles the three-dimensional object is observed.

The visually observed color of the three-dimensional object may also be changed by the state of roughness of the surface, different widths of the coloring layer, and so on, for example. Regarding this phenomenon of the change of appearance of the color, the inventors of the application have confirmed the effects of forming the transparent layer between the light reflection layer and the coloring layer considering the difference in the state of roughness of the surface, the width of the coloring layer, and so on.

Subsequently, a preferable width of the transparent layer formed between the light reflection layer and the coloring layer is described. In this case, the width of the transparent layer refers to the width in the direction perpendicular to the surface layer of the three-dimensional object, for example. The inventors of the application also confirmed the preferable width of the transparent layer through various experiments, and confirmed that it is possible to appropriately prevent the ink configuring the light reflection layer and the ink configuring the coloring layer from being mixed with each other if the width of the transparent layer is set to one dot or more in terms of the modeling resolution. In this case, the width of one dot or more in modeling resolution refers to the width of one three-dimensional pixel (voxel), for example. In addition, one three-dimensional pixel is the smallest unit of the elements that configure the three-dimensional object, for example. Moreover, one three-dimensional pixel may refer to a part formed by one ink drop, for example.

Besides, more specifically, when the modeling is performed with a resolution of 600 dpi, for example, the theoretical width (theoretical value) of one dot will be about 40 µm (more specifically, about 42 µm). Therefore, in this case, it can be said that the width of the transparent layer formed between the light reflection layer and the coloring layer is preferably set to about 40 µm or more. Additionally, in order to more securely prevent mixture of the ink, it is preferable to form a transparent layer having a width of two dots or more between the light reflection layer and the coloring layer. In this case, it can be said that the width of the transparent layer is preferably set to about 80 µm or more.

Through further experiments, the inventors of the application also found out that an excessively large width of the transparent layer formed between the light reflection layer and the coloring layer will cause problems. More specifically, it was found that if the width of the transparent layer formed between the light reflection layer and the coloring layer is excessively large, for example, the color density visually observed from the outside of the three-dimensional object may decrease and the desired color may not be expressed. In this case, decrease of the color density refers to a phenomenon that the color looks like light-color. Such a phenomenon is considered as a consequence of change of reflection manner of the light or attenuation of the light in the transparent layer due to that the distance between the light reflection layer and the coloring layer is increased by the wide transparent layer sandwiched therebetween.

In addition, more specifically, such a phenomenon becomes obvious when the width of the transparent layer exceeds 150 µm, for example. Therefore, the width of the transparent layer formed between the light reflection layer and the coloring layer in the direction perpendicular to the surface layer of the three-dimensional object is preferably set to 150 µm or less. The width of the transparent layer may be a designed width, for example. In addition, it is more preferable to set the width of the transparent layer to 100 µm or less. Furthermore, the width of the transparent layer may also be set to 50 µm or less.

According to this configuration, for example, it is possible to suppress the influence caused by an excessively large width of the transparent layer as well as appropriately prevent the ink configuring the light reflection layer and the ink configuring the coloring layer from being mixed with each other, and thereby more appropriately prevent the visually observed color from changing according to the angles the three-dimensional object is observed, for example.

The disclosure is not limited to the illustrative embodiment and the modified embodiments and can be variously modified within the scope of the claims. The illustrative embodiments that are to be obtained by appropriately combining the technical units described in the illustrative embodiment and the modified embodiments are also included in the technical scope of the disclosure. Further, it is possible to conceive a new technical feature by combining the technical units described in the illustrative embodiment and the modified embodiments.

The disclosure can be appropriately applied to the apparatus for forming a three-dimensional object, for example.

What is claimed is:

1. A method for forming a three-dimensional object, the method using:
   a head for reflective ink, which is an inkjet head configured to eject ink droplets of an ink having light reflectivity and is configured to form a light reflection layer, which is a layer of the ink having the light reflectivity;
   a head for decorative ink, which is an inkjet head configured to eject ink droplets of a decorative ink, which is an ink for decoration for the three-dimensional object, and is configured to form a decorative layer, which is a layer of the decorative ink, and
   a head for transparent ink, which is an inkjet head configured to eject ink droplets of a transparent ink, which is an ink of a transparent color, and is configured to form a transparent layer, which is a layer of the transparent ink,
   the method comprising enabling the head for reflective ink, the head for decorative ink and the head for transparent ink to perform:

a main scanning operation of relatively moving to the three-dimensional object being formed in a preset main scanning direction and ejecting the ink droplets, and a sub-scanning operation of relatively moving to the three-dimensional object being formed in a sub-scanning direction perpendicular to the main scanning direction, wherein at least the head for decorative ink and the head for transparent ink are arranged to be positionally offset in the sub-scanning direction, and wherein the transparent layer is formed between the light reflection layer and the decorative layer by using the head for reflective ink, the head for decorative ink and the head for transparent ink, so that the decorative layer, the transparent layer and the light reflection layer are formed in corresponding order from a surface layer-side of the three-dimensional object towards an inner side of the three-dimensional object, wherein the three-dimensional object is formed by laminating a plurality of layers in a direction which is perpendicular to the main scanning direction and the sub-scanning direction, and with respect to each layer of the three-dimensional object havning the decorative layer, the transparent layer and the light reflection layer, the each layer is along a plane extending in the main scanning direction and the sub-scanning direction, and the decorative layer, the transparent layer and the light reflection layer are formed in this order from the surface layer-side toward the inner side along the plane.

2. The method for forming a three-dimensional object according to claim 1, wherein the head for reflective ink is arranged to be positionally offset in the sub-scanning direction with respect to each of the head for decorative ink and the head for transparent ink.

3. The method for forming a three-dimensional object according to claim 1, wherein the head for transparent ink is configured to form a first transparent layer between the light reflection layer and the decorative layer and to further form a second transparent layer on the surface layer-side of the decorative layer.

4. The method for forming a three-dimensional object according to claim 1, wherein the head for transparent ink is configured to supplement an ink filling density of the decorative layer by the transparent ink at a place where the ink filling density of the decorative layer does not satisfy a predetermined ink filling density only with the decorative ink.

5. The method for forming a three-dimensional object according to claim 1, wherein the method for forming a three-dimensional object is configured to form the three-dimensional object by laminating a plurality of layers, and wherein the head for reflective ink, the head for decorative ink and the head for transparent ink are configured to form a part of the decorative layer, a part of the transparent layer, and a part of the light reflection layer in corresponding order from an end portion towards a center-side of each layer of two or more layers of the plurality of layers.

6. The method for forming a three-dimensional object according to claim 5, wherein the head for transparent ink is configured to form a first transparent layer between the light reflection layer and the decorative layer and to further form a second transparent layer on the surface layer-side of the decorative layer, and wherein each of the two or more layers has the part of the decorative layer between a part of the first transparent layer and a part of the second transparent layer.

7. The method for forming a three-dimensional object according to claim 6, wherein the three-dimensional object has an area where the layers, each of which has the part of the decorative layer between the part of the first transparent layer and the part of the second transparent layer, are laminated each other, and wherein in the area, a part with which the part of the decorative layer included in any layer and the part of the decorative layer included in the layer laminated above or below any layer are not overlapped is overlapped with the part of the decorative layer included in any layer and the part of the first transparent layer or the part of the second transparent layer included in the layer laminated above or below any layer.

8. The method for forming a three-dimensional object according to claim 1, further using:

a flattening unit configured to flatten a top surface of the three-dimensional object being formed, wherein the head for transparent ink is configured to eject the ink droplets of the transparent ink onto the decorative ink of the decorative layer, and wherein the flattening unit is configured to flatten at least the layer of the transparent ink formed on the decorative ink.

9. The method for forming a three-dimensional object according to claim 1, wherein a width of the transparent layer formed between the light reflection layer and the decorative layer in a direction perpendicular to a surface layer of the three-dimensional object is 150 μm or less.

* * * * *